US012614925B2

(12) United States Patent
DeBartolo et al.

(10) Patent No.: US 12,614,925 B2
(45) Date of Patent: Apr. 28, 2026

(54) RECEPTACLE INDUCTIVE CHARGING DEVICES

(71) Applicant: Hubbell Incorporated, Shelton, CT (US)

(72) Inventors: Joseph DeBartolo, North Stonington, CT (US); Thomas Scanzillo, Monroe, CT (US); Victor Flagello, Shelton, CT (US); Kenny Padro, Hamden, CT (US); John Brower, Fairfield, CT (US); Jian Hua Li, Bayside, NY (US); Scott Wurms, Shelton, CT (US); Brian Rock, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 699 days.

(21) Appl. No.: 18/001,397

(22) PCT Filed: Jun. 11, 2021

(86) PCT No.: PCT/US2021/036965
§ 371 (c)(1),
(2) Date: Dec. 9, 2022

(87) PCT Pub. No.: WO2021/252866
PCT Pub. Date: Dec. 16, 2021

(65) Prior Publication Data
US 2023/0344272 A1 Oct. 26, 2023

Related U.S. Application Data

(60) Provisional application No. 63/037,870, filed on Jun. 11, 2020.

(51) Int. Cl.
*H01M 10/46* (2006.01)
*H01R 25/00* (2006.01)
(Continued)

(52) U.S. Cl.
CPC .......... *H02J 50/005* (2020.01); *H01R 25/006* (2013.01); *H02J 7/0044* (2013.01); *H02J 7/0047* (2013.01); *H02J 50/10* (2016.02)

(58) Field of Classification Search
CPC ...... H02J 7/0044; H02J 7/0042; H02J 7/0047; H02J 50/005; H02J 50/10; H02J 50/90; H01R 25/006
(Continued)

(56) References Cited

U.S. PATENT DOCUMENTS

| | | |
|---|---|---|
| 7,183,487 B1 | 2/2007 | O'Young et al. |
| 10,044,205 B1 | 8/2018 | Voelz et al. |

(Continued)

FOREIGN PATENT DOCUMENTS

| | | |
|---|---|---|
| WO | 2012051358 A2 | 4/2012 |
| WO | 2018187304 A1 | 10/2018 |
| WO | WO-2021150292 A1 * | 7/2021 ............. H02J 50/10 |

OTHER PUBLICATIONS

Search Report and Written Opinion issued in PCT Patent Application No. PCT/US2021/036965 dated Oct. 13, 2021.
(Continued)

*Primary Examiner* — Edward Tso
(74) *Attorney, Agent, or Firm* — Michael Best & Friedrich LLP

(57) ABSTRACT

A wall outlet inductive charger includes a base having a receptacle portion and an inductive charging portion. A faceplate is connected to the base. A device support extends from the faceplate. A charger assembly is connected to the base and positioned between the base and the faceplate. The charger assembly includes an inductive coil.

20 Claims, 22 Drawing Sheets

(51) Int. Cl.
     *H02J 7/00*         (2006.01)
     *H02J 50/00*        (2016.01)
     *H02J 50/10*        (2016.01)

(58) Field of Classification Search
     USPC ................................. 320/107, 108, 114, 115
     See application file for complete search history.

(56) References Cited

U.S. PATENT DOCUMENTS

| | | | |
|---|---|---|---|
| 10,340,722 B2 * | 7/2019 | Rohmer ................ | H02J 7/0044 |
| 2018/0123361 A1 | 5/2018 | Gray | |
| 2018/0287425 A1 * | 10/2018 | Mortun ................. | H02J 7/0044 |

OTHER PUBLICATIONS

Extended European Search Report dated Jun. 18, 2024 for corresponding European Application No. 21823015.9.

\* cited by examiner

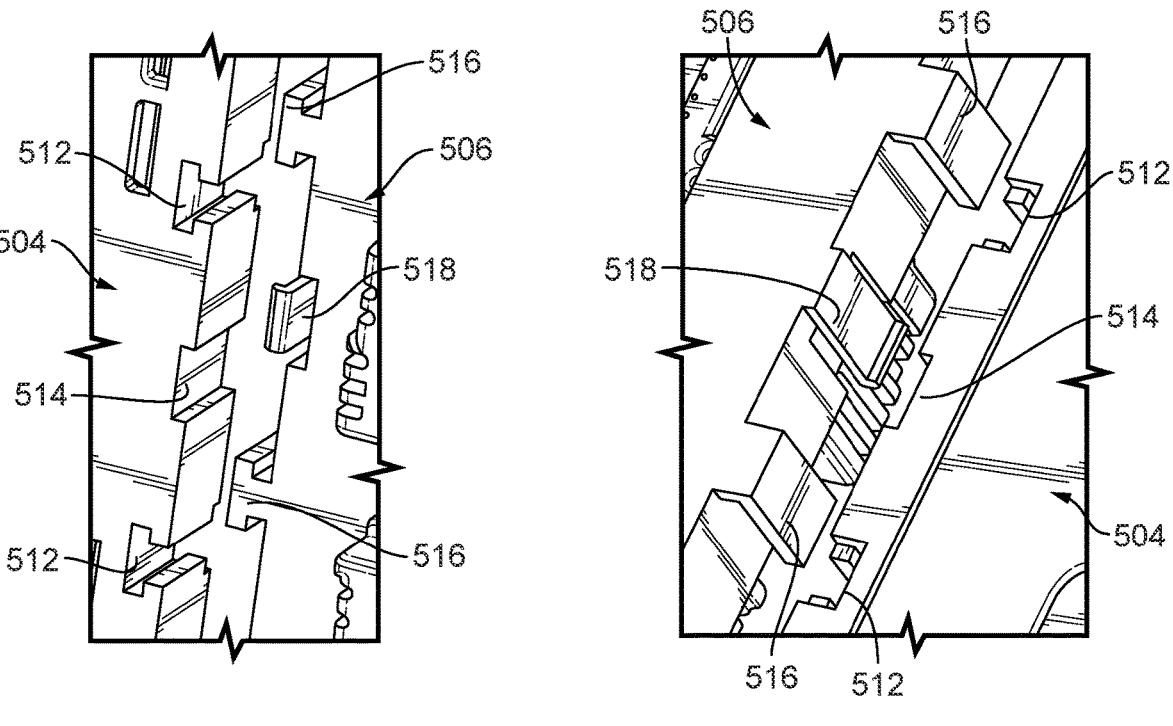
FIG. 25          FIG. 26
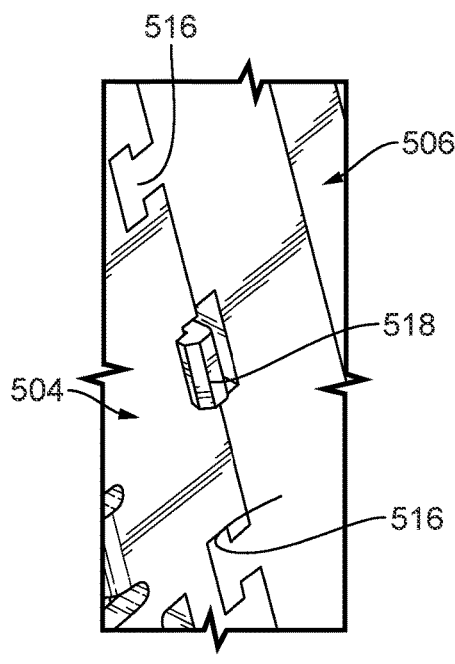
FIG. 27

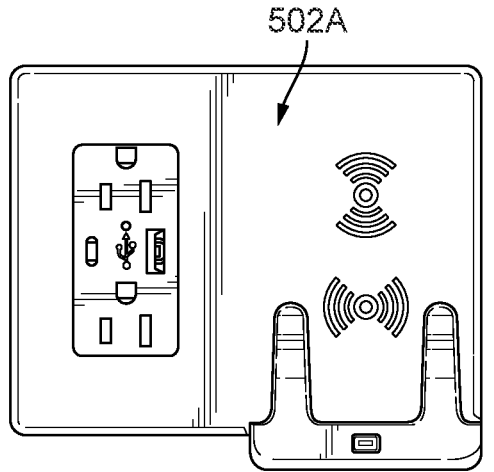
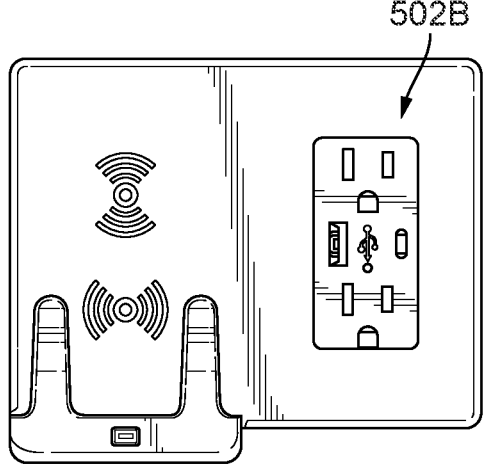
FIG. 28
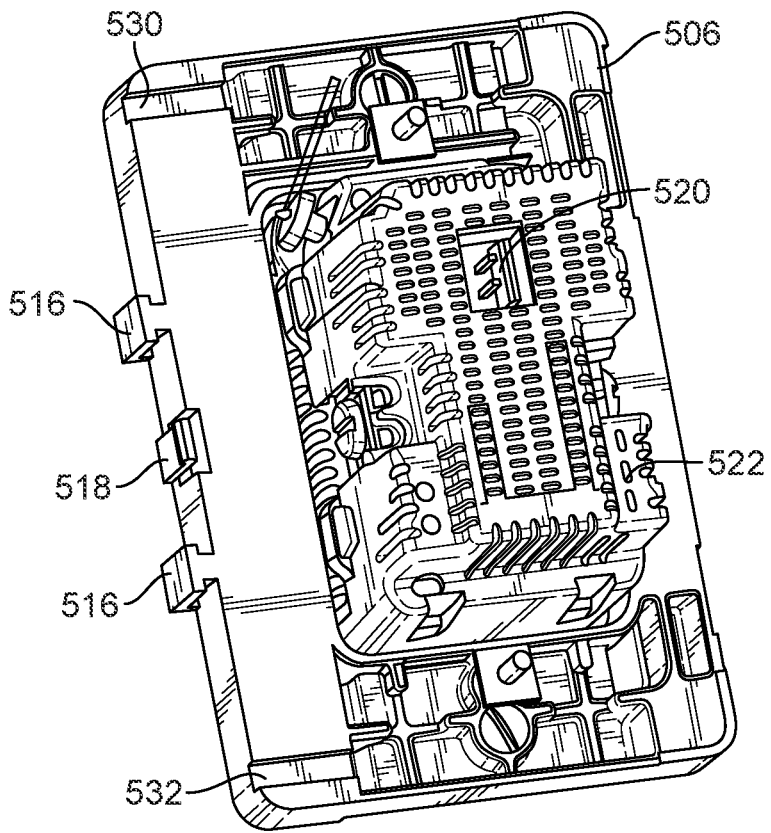
FIG. 29

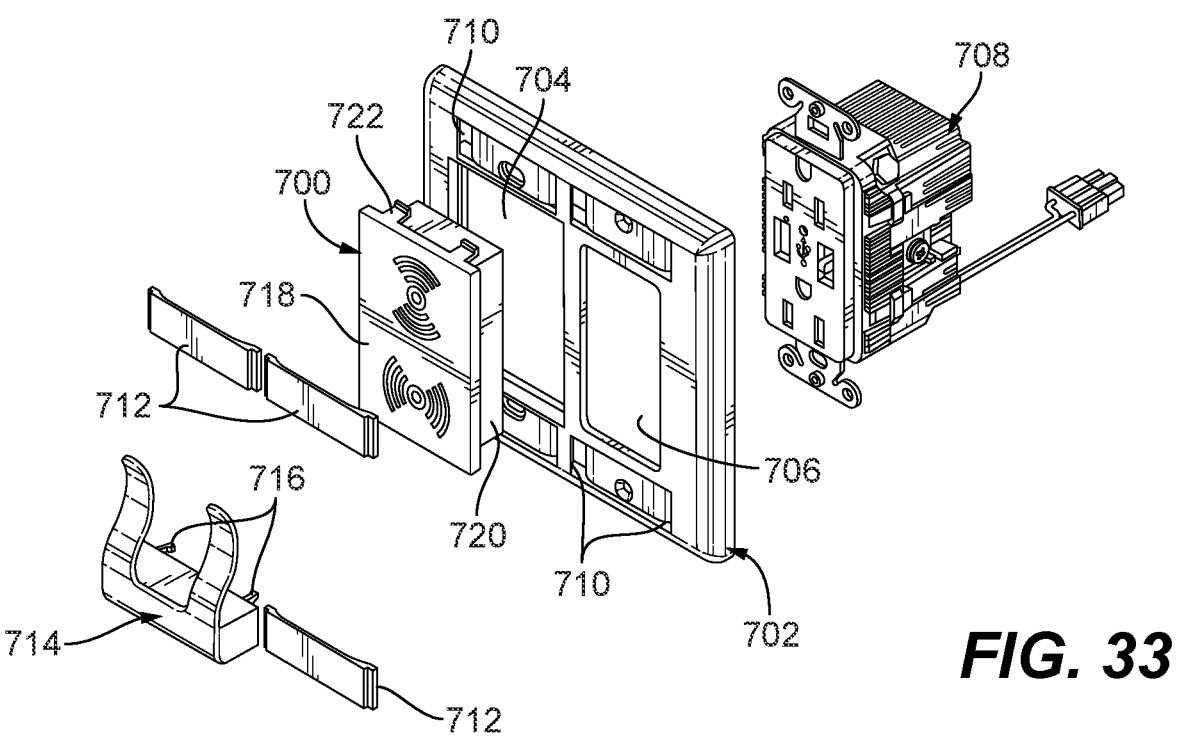
FIG. 33
FIG. 34
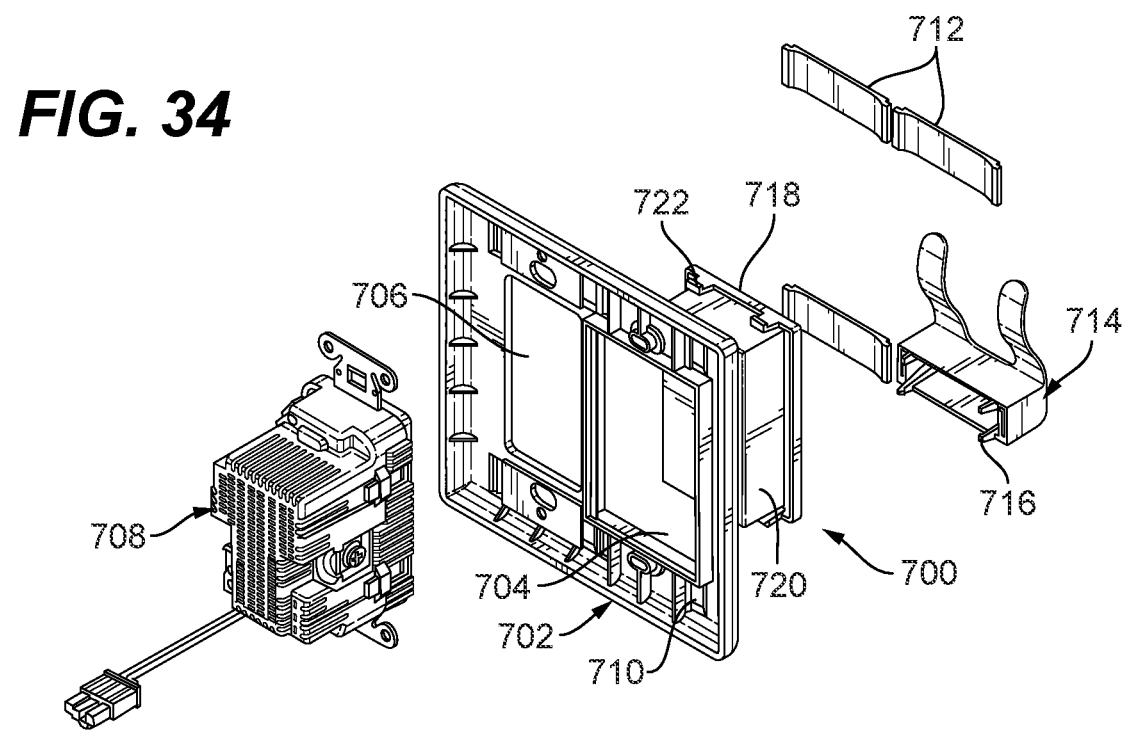

RECEPTACLE INDUCTIVE CHARGING DEVICES

RELATED APPLICATION(S)

This application is based on U.S. Provisional Application Ser. No. 63/037,870, filed Jun. 11, 2020, the disclosure of which is incorporated herein by reference in its entirety and to which priority is claimed.

FIELD

Various exemplary embodiments relate to devices for inductive charging personal electronics.

BACKGROUND

Electrical outlet boxes that house power and/or data receptacles are well-known in the industry. Such boxes can stand alone or be recessed within any of a wall, the floor or the ceiling of a room. Conventional electrical outlets have a housing that is connected to a recessed junction box. The housing can include a separate front and back covers that are connected by screws. A mounting strap with flanges at opposite ends generally extends between the front and back covers and allows the housing to be attached to a suitable structure, such as a building wall or a junction box. In some electrical receptacle designs, the mounting strap has a generally U-shape so as to wrap around portions of the front and back covers of the housing. In other electrical receptacle designs, the mounting strap is a relatively flat shape and is disposed between the front and back covers of the housing.

Typical wall outlets provide power to electronic devices using a power socket connected to a main power supply. In the United States, standard wall outlets generally provide power via a two or three pronged socket or other alternative socket such as a universal serial bus (USB) port. Portable devices, such as cell phones, tablets, music players, and other personal electronic devices are being configured to be charged not only by typical male/female connectors, but through wireless inductive charging.

SUMMARY

According to certain aspects, a wall outlet inductive charger includes a base having a receptacle portion and an inductive charging portion. A faceplate is connected to the base. A device support extends from the faceplate. A charger assembly is connected to the base and positioned between the base and the faceplate. The charger assembly includes an inductive coil.

According to certain aspects, a wall outlet inductive charger includes a base having a receptacle portion and an inductive charging portion. A faceplate is connected to the base. A device support extends from the faceplate. A charger assembly is connected to the base and positioned between the base and the faceplate. The charger assembly includes an inductive coil. The base is configured to connect to a one-gang wall opening and the charger assembly receives power from a device positioned in the receptacle opening.

According to certain aspects, a wall outlet inductive charger includes a wall plate having a first opening, a second opening, a set of upper slots and a set of lower slots. An inductive charger unit is positioned in the first opening. The inductive charger unit has a base, a faceplate, and an inductive charger positioned between the base and a faceplate. A device support is connected to one of the lower slots beneath the inductive charger unit. An outlet is positioned in the second opening.

BRIEF DESCRIPTION OF THE DRAWINGS

The aspects and features of various exemplary embodiments will be more apparent from the description of those exemplary embodiments taken with reference to the accompanying drawings.

FIG. 25 is an enlarged partial, rear perspective view of the device base and the charger base moving into an assembled position.

FIG. 26 is an enlarged partial, front perspective view of the device base and the charger base moving into an assembled position.

FIG. 27 is an enlarged partial, rear perspective view of the device base and the charger base assembled.

FIG. 28 is a front view of the charger with a right-hand configuration and a left-hand configuration.

FIG. 29 is a rear perspective view the device base with an outlet having a DC output connector.

FIG. 33 is a front perspective view of an inductive charging unit for use with a wall plate.

FIG. 34 is a rear perspective view of the inductive charger of FIG. 33.

DETAILED DESCRIPTION OF EXEMPLARY EMBODIMENTS

Figure 1:
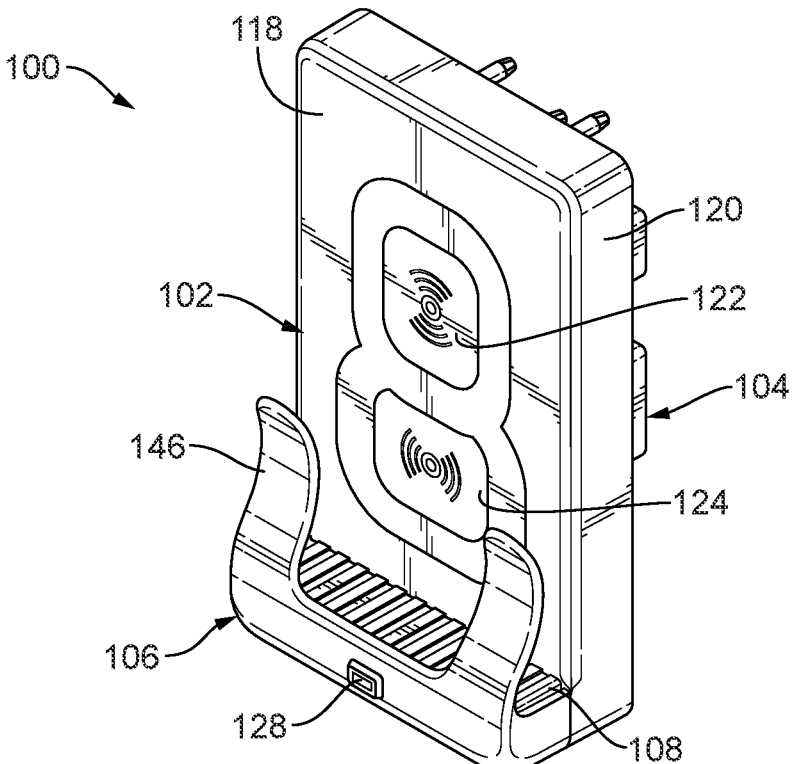
FIG. 1 is a perspective view of an exemplary receptacle inductive charger.
Figure 2:
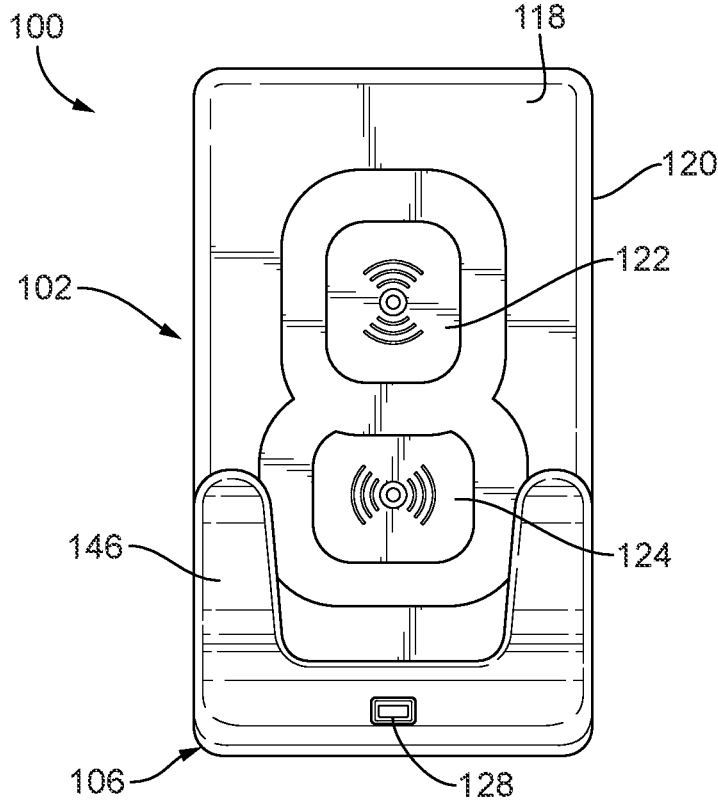
FIG. 2 is a front view of FIG. 1.
Figure 3:
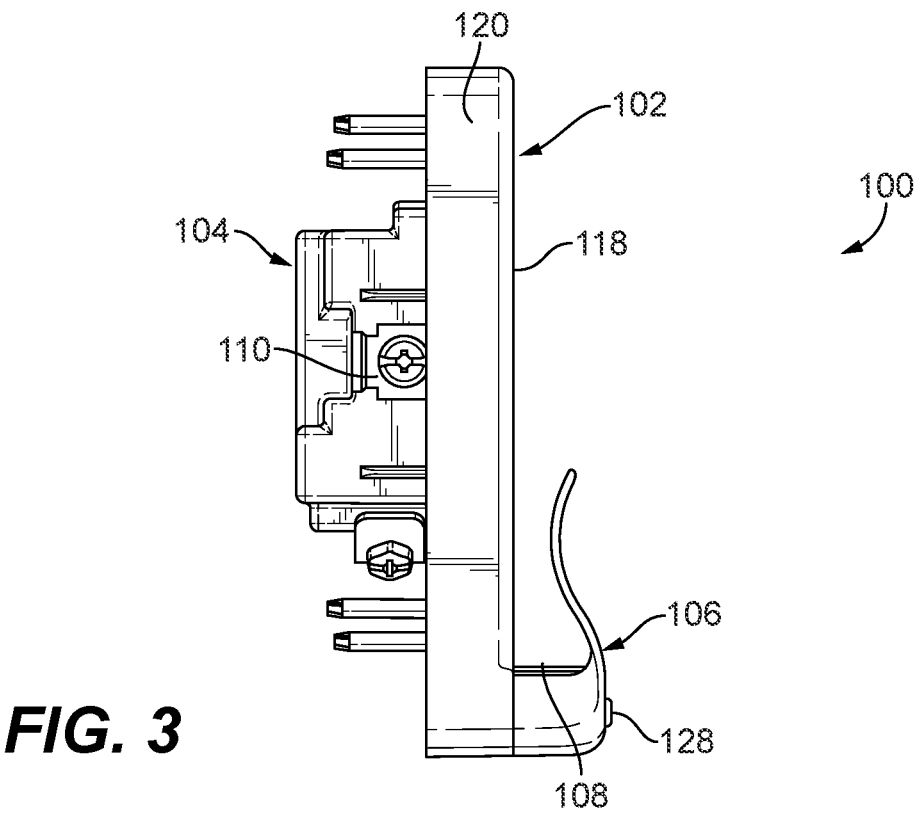
FIG. 3 is a side view of FIG. 1.
Figure 4:
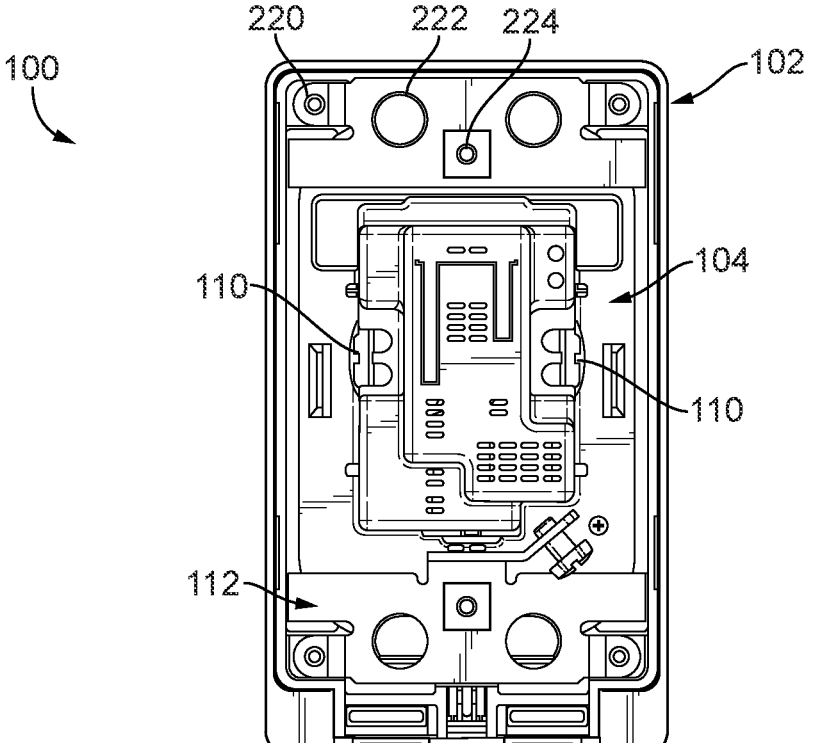
FIG. 4 is a rear view of FIG. 1.

Various exemplary embodiments are directed to inductive charging devices that can be connected to or incorporated with typical power receptacles or other electrical devices (e.g., switches, control panels, smart-home systems).

FIGS. 1-4 show an exemplary embodiment of an inductive charger 100 that is configured to connect to a standard one-gang receptacle opening. The charger 100 includes a faceplate 102 that is connected to a base 104. A device support 106 extends from the faceplate 102 to receive an electronic device for charging. The device support 106 can include a pad 108 to provide increased friction and/or a cushioned surface for the electronic device. The base 104 includes a pair of side terminal connections 110 for receiving power supply conductors. The base 104 is connected to a mounting bracket 112 that can be connected to an outlet housing or junction box. A charger assembly 114 (FIGS. 8-10) and a set of electrical components 116 (FIG. 13) are positioned between the faceplate 102 and the base 104 to provide inductive charging to an electronic device. The electrical components 116 can include control circuitry that is configured to power and control one or more inductive coils. The control circuitry can include components to provide power conversion, frequency modulation, and other features associated with inductive charging. These features can be established by one or more industry standards, for example, the Qi wireless charging standard.

Figure 5:
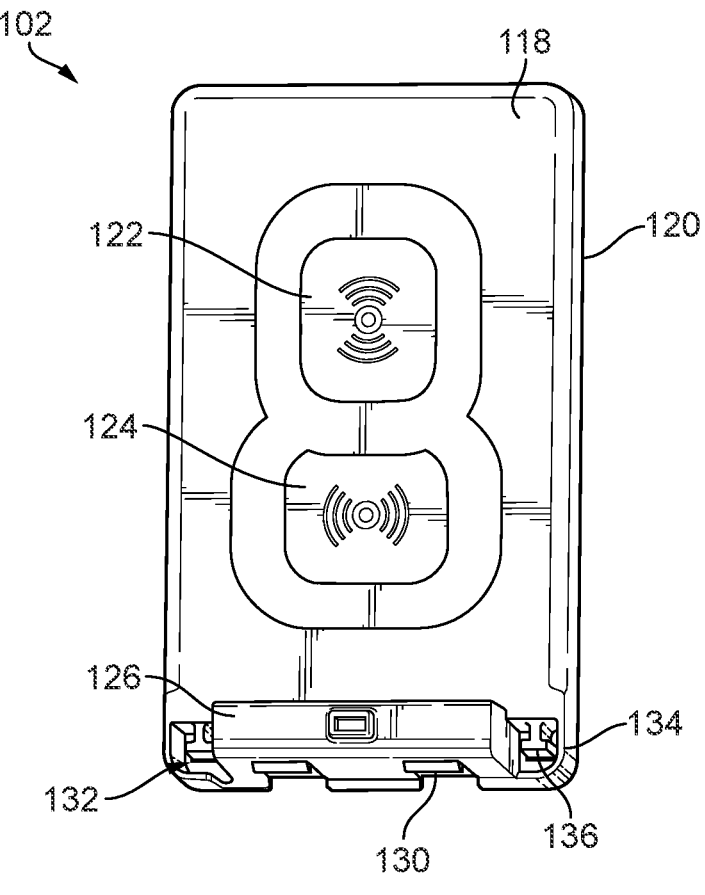
FIG. 5 is a front perspective view of an exemplary faceplate.
Figure 6:
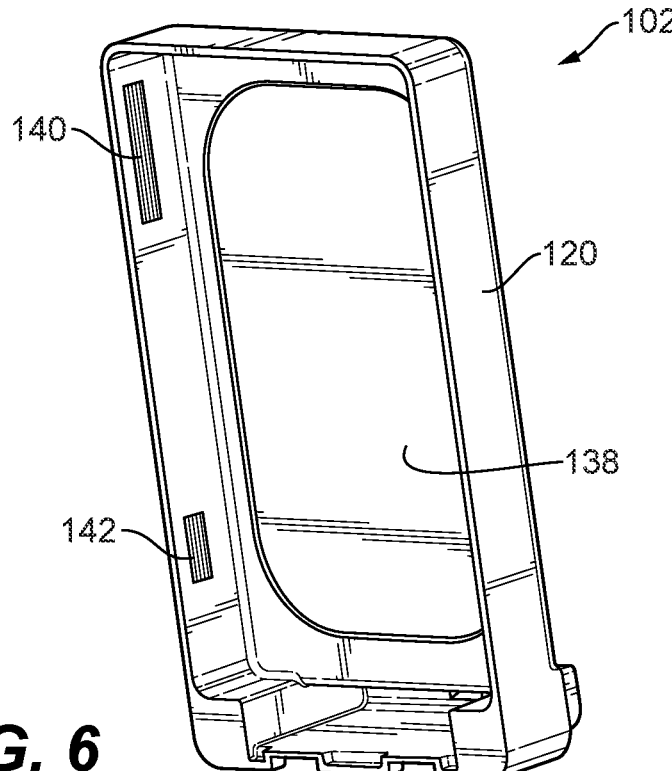
FIG. 6 is a rear perspective view of FIG. 5.

FIGS. 5 and 6 show an exemplary embodiment of the faceplate 102 that includes a front wall 118 and an outer edge 120 that define an interior. The front wall 118 includes an upper section having a charging region with a first charging portion 122 and a second charging portion 124. The first and second charging portions 122, 124 can accommodate different devices and devices in different orientations. For example, the first charging portion 122 can charge a phone in a vertical, or portrait, orientation and the second charging portion 124 can charge a phone in a horizontal, or landscape, orientation.

The lower section of the faceplate includes a ledge 126 extending outwardly from the charging region. The ledge 126 includes an aperture for receiving an indicator light 128 (indicated in FIG. 2), for example and LED. The bottom of the ledge 126 includes a snap-fit connection feature, for example first and second protrusions 130 having a ramped surface. A side pocket 132 is positioned on both sides of the ledge 126. The side pockets 132 include an outer flange 134 extending around a depression. An inverted T-shaped protrusion 136 extends through the side pockets 132. The T-shaped protrusion 136 defines a first channel and a second channel on respective sides of the protrusion 136.

FIG. 6 shows the interior compartment of the faceplate 102 which includes a depression 138 for receiving the charger assembly 114. A set of upper ribs 140 and a set of lower ribs 142 extend from the outer edge 120 on each side of the faceplate 102 into the interior compartment. Grooves are defined between each of the ribs 140, 142. The ribs 140, 142 are used to adjustably connect the faceplate 102 to the base 104.

Figure 7:
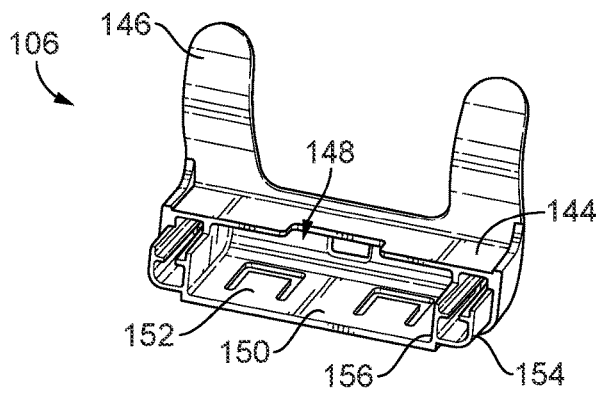
FIG. 7 is a rear perspective view of an exemplary device support.

FIG. 7 shows an exemplary embodiment of the device support 106 having an outer ledge 144 for supporting an electronic device. One or more prongs 146, for example first and second prongs 146 extend up from the sides of the outer ledge 144. Although shown as split prongs 146, a single prong or more than two prongs can be used. The prongs 146 curve toward the faceplate 102 and can be resilient to accommodate devices of different thicknesses. The device support 106 includes a central region 148 having an opening receiving the indicator light 128. A bottom wall 150 of the central region includes a snap fit connector for connecting the device support 106 to the faceplate 102. For example, a set of flexible tabs 152 are provided to mate with the ramped projections 130 on the faceplate 102. When making the connection, the tabs 152 deflect as they slide over the ramped projections 130 which are received in openings in front of the tabs 152. A side track is positioned on both sides of the central region 148. The side tracks include an outer rim 154 and a pair of rails 156. A groove is defined between the rails 156 for receiving the T-shaped protrusion 136 of the faceplate 102.

Figure 8:
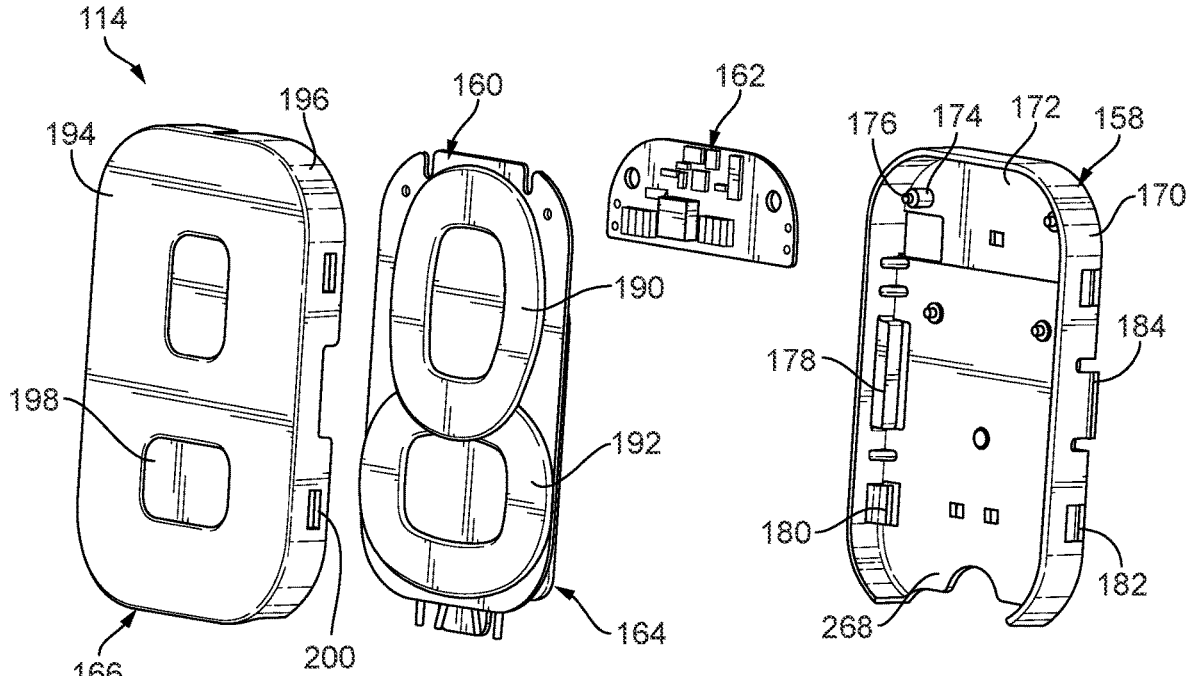
FIG. 8 is an exploded view of an exemplary charger assembly.
Figure 9:
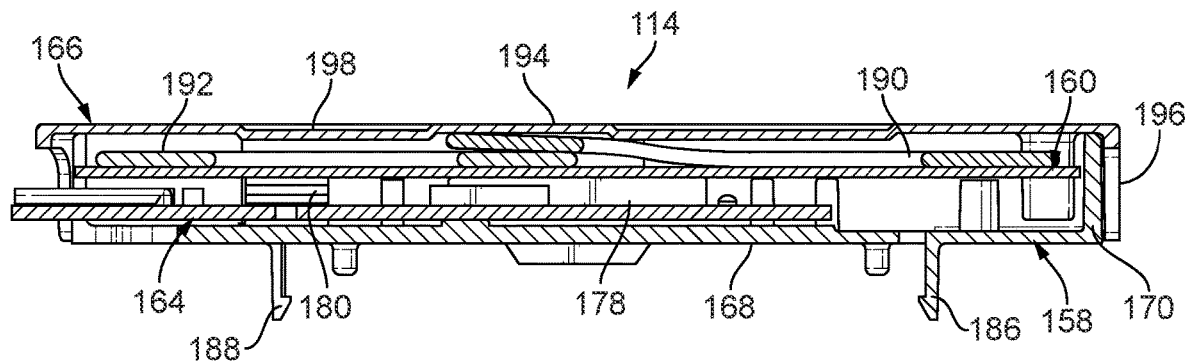
FIG. 9 is a side, sectional view of the assembled charger assembly of FIG. 8.
Figure 10:
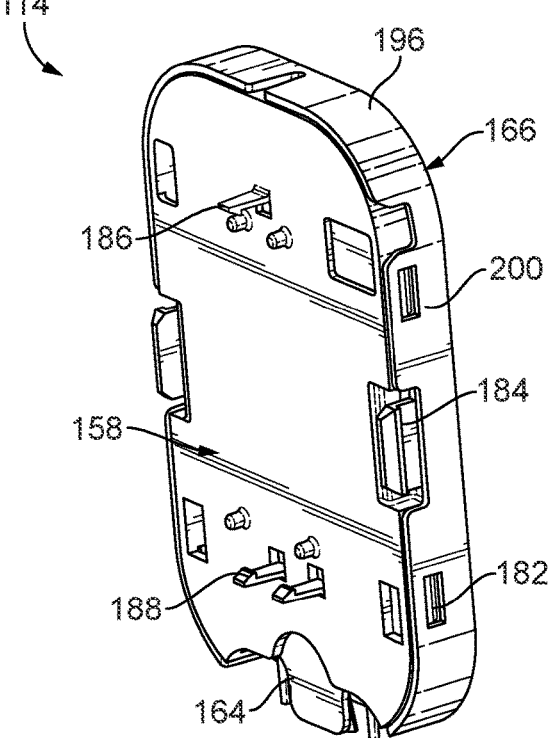
FIG. 10 is a rear perspective view of FIG. 9.

FIGS. 8-10 show an exemplary embodiment of the charger assembly 114 that includes a rear cover 158, a charging pad 160, an upper circuit board 162, a lower circuit board 164, and a front cover 166. The upper and lower circuit boards 162, 164 are configured to control the power through the charging pad 160. For example, the upper and lower circuit boards 162, 164 can include control circuitry that converts, modifies, or otherwise controls the power received from a main power supply to an appropriate current or voltage to power the charging pad 160. For example, the circuit boards 162, 164 can convert the input power from high voltage AC to a low voltage AC or DC and supply the converted power to the charging pad 160. The circuit board 162, 164 can also be configured to accept a low voltage AC or DC power supply that is converted from main power supply by an upstream component. The circuit boards 162, 164 can also control the frequency of a drive signal emitted to the charging pad 160. Components and layout of the control circuitry would be understood by one of ordinary skill in the art and can be in compliance with an industry standard such as the Qi wireless charging standard. The front cover 166 and rear cover 158 are connected together and define a chamber for receiving the charging pad 160 and the upper and lower circuit boards 162, 164. When assembled together, the charger assembly 114 is received in the base 104.

The rear cover 158 includes a rear wall 168 and an outer wall 170 that define an interior. A depression 172 is provided in an upper section of the rear wall 168 for receiving the upper board 162. A pair of bosses 174 extend from the rear wall 168 and the upper board 162 is provided with openings corresponding to the bosses 174. The bosses 174 include an upper knub 176. A support 178 extends from the interior of the outer wall 170 on each side of the rear cover 158 to hold the charging pad 160. A hook 180 extends from the interior of the outer wall 170 on each side of the rear cover 158 to support the lower board 164.

The exterior of the outer wall 170 includes a first snap-fit connector for connecting to the front cover 166 and a second snap-fit connector for connecting to the base 104. The first snap-fit connector includes an upper and lower ramped protrusion 182. The second snap-fit connector includes a deflectable arm with a hooked protrusion 184. As best shown in FIG. 10, the exterior of the rear wall 168 includes snap-fit connectors including an upper hook 186 and a pair of lower hooks 188.

The charging pad 160 includes a first charging coil 190 and a second charging coil 192. The first and second charging coils 190, 192 correspond to the first and second charging portions 122, 124 of the faceplate 102 to accommodate different devices and devices in different orientations. As discussed above, the upper and lower circuit boards 162, 164 can include control circuitry that controls the output of the charging coils 190, 192. A pair of openings are provided in the upper portion of the charging pad 160 that receive the knubs 176 from the rear cover 158.

The front cover 166 includes a front wall 194 and an outer edge 196 extending from the front wall 194. Indentions 198 are provided in the front wall 194 that align with the centers of the charging coils 190, 192. A snap-fit connector is provided on the outer edge 196 for connecting the front cover 166 to the rear cover 158. The connector includes upper and lower slots 200 that receive the ramped protrusions 182 from the rear cover 158.

Figure 11:
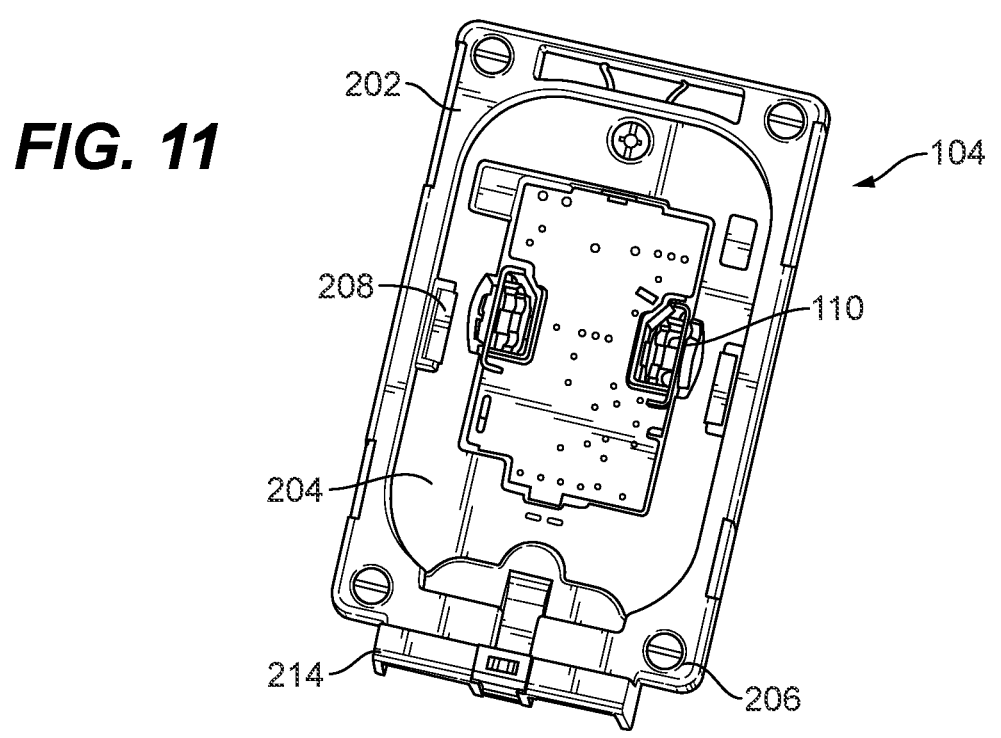
FIG. 11 is a front perspective view of an exemplary base and a set of electrical components received therein.
Figure 12:
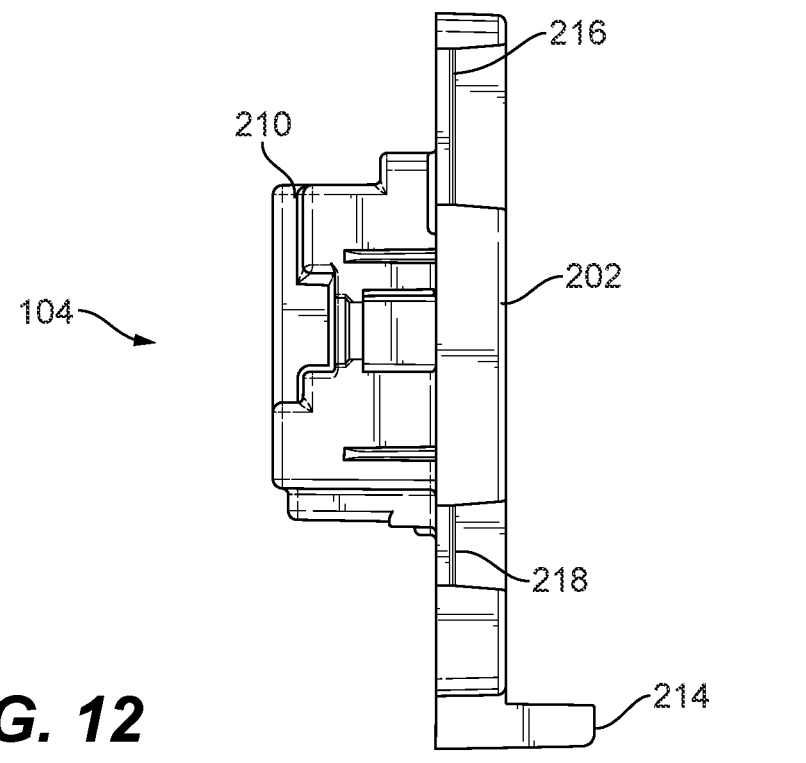
FIG. 12 is a side view of FIG. 11.
Figure 13:
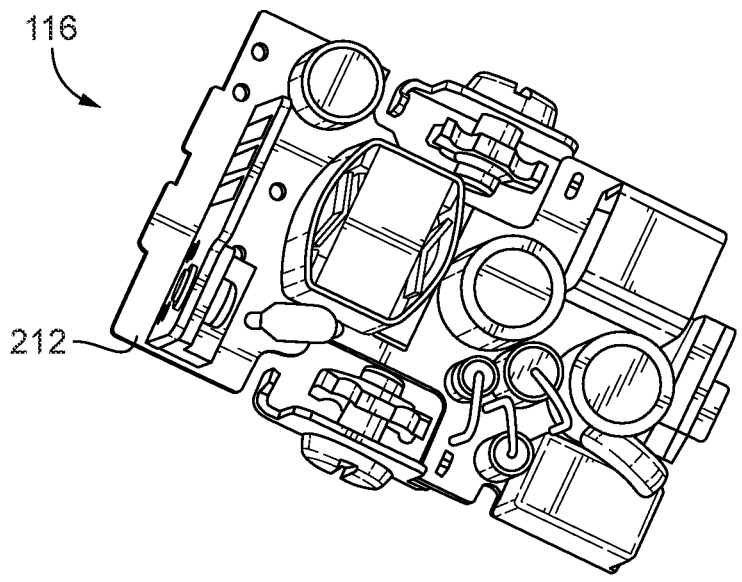
FIG. 13 is a rear perspective view of an exemplary set of electrical components.

FIGS. 11 and 12 show an exemplary embodiment of the base 104 that includes a raised outer edge 202 surrounding a rear wall 204. The outer edge 202 includes corner openings 206 that are configured to receive fasteners to connect the base 104 to the mounting bracket 112. The rear wall 204 is configured to receive the charger assembly 114. A pair of slots 208 are provided in the rear wall 204 to receive the deflectable arm 184 of the rear cover 158. A chamber 210 is provided in the rear wall 204 for receiving the component assembly 116, including a component board 212 and a number of electrical components connected to the board 212 (FIG. 13). The components are configured to convert the power supply received by the terminals 110. For example, the components can convert the input power from high voltage AC to a low voltage AC or DC and supply the converted power.

The base 104 is configured to mate with the faceplate 102. As best shown in FIG. 12, a lower portion 214 extends from the rear wall 204 to engage the ledge 126 of the faceplate 102. The sides of the base 204 include an upper protrusion 216 and a lower protrusion 218. In an exemplary embodiment the protrusions 216, 218 are tapered as they extend outwardly from the side edge, having a base and a point that gives them a substantially triangular cross-section, although other shapes can be used. When the faceplate 102 is connected to the base 104, the ribs 140, 142 on the interior of the faceplate 102 will slide over the respective protrusion 216, 218 so that the protrusions 216, 218 will mate with the grooves defined between the ribs 140, 142. In this way, the position of the faceplate 102 is adjustable relative to the base 104 so that the faceplate 102 can be positioned flush to a wall.

Figure 14:
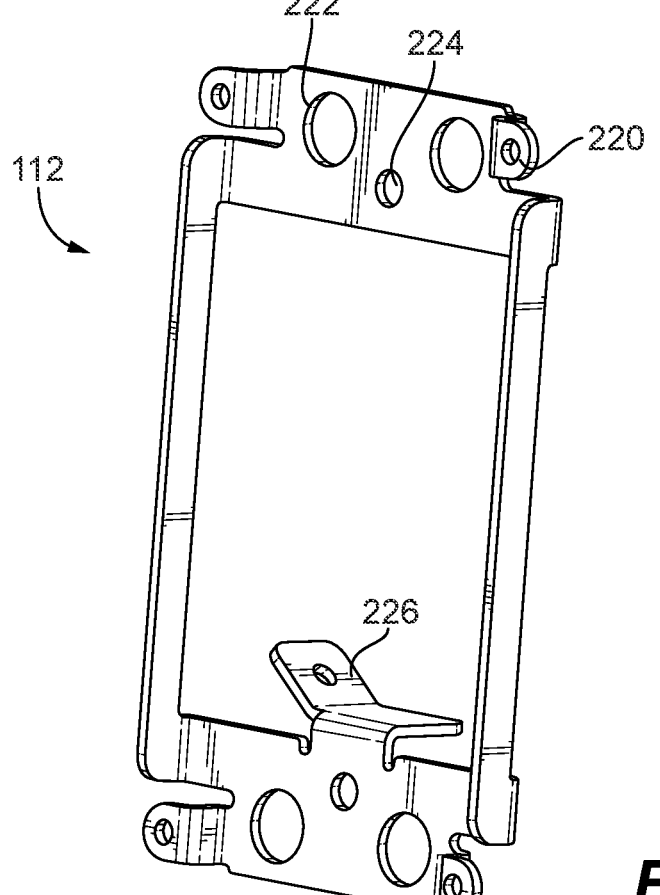
FIG. 14 is a front perspective view of an exemplary mounting bracket.

FIG. 14 shows an exemplary embodiment of the mounting bracket 112. The mounting bracket 112 includes corner flanges 220 that receive fasteners connected to the base 104. The mounting bracket 112 includes a first set of openings 222 and a second set of openings 224 to connect to a junction box or outlet housing. A ground tab 226 allows the mounting bracket 112 to be connected to a ground wire.

Figure 15:
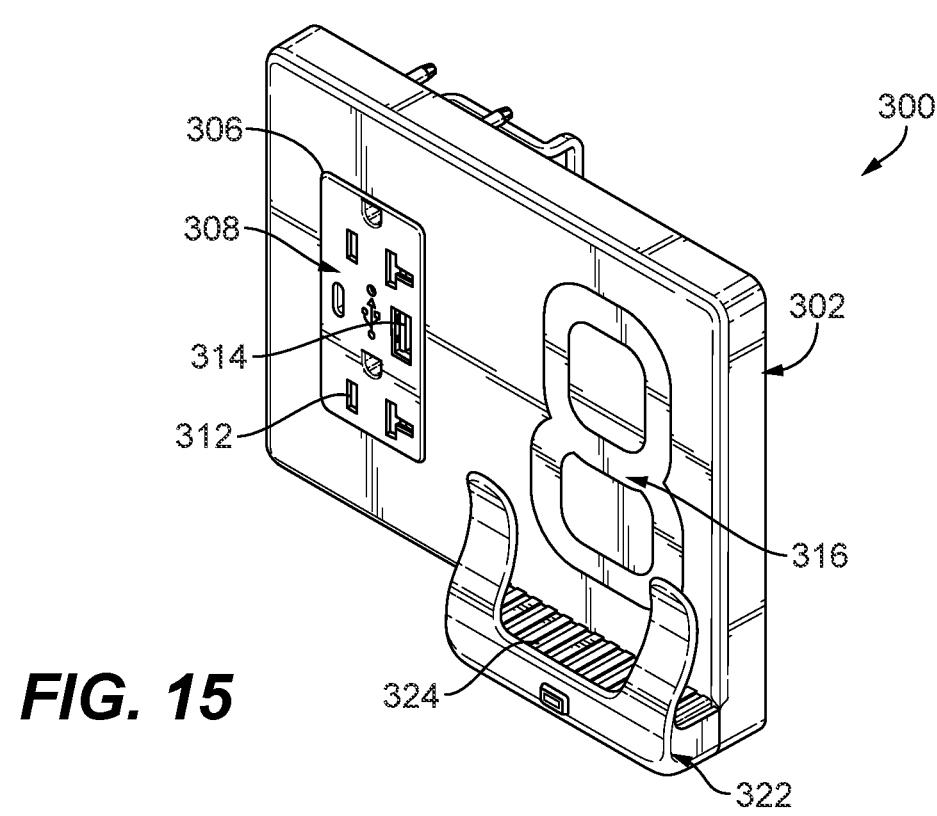
FIG. 15 is front perspective view of an exemplary two-gang charger.
Figure 16:
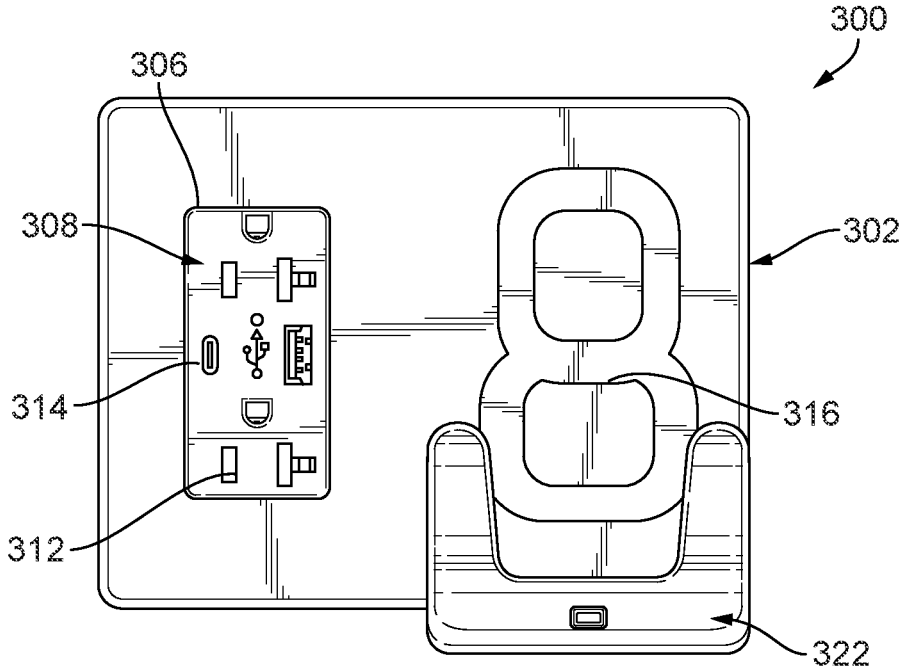
FIG. 16 is a front view of FIG. 15.
Figure 17:
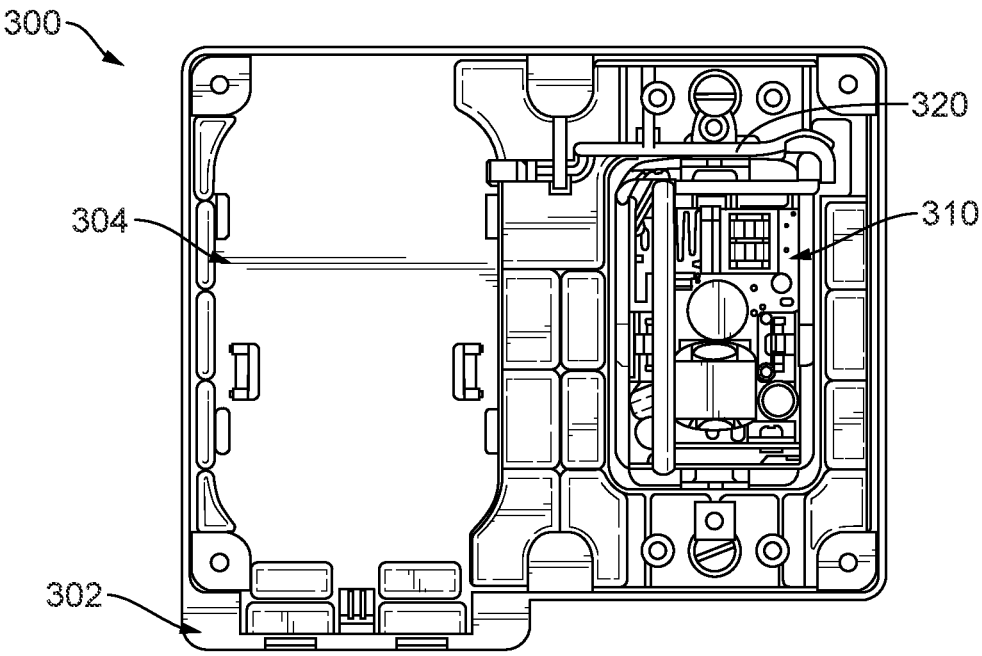
FIG. 17 is a rear view of FIG. 15.

FIGS. 15-17 show an exemplary embodiment of a two-gang charger 300 configuration with a receptacle portion and an inductive charger portion. The two-gang charger 300 includes a faceplate 302 that is connected to a base 304. A first side of the faceplate 302 includes a receptacle opening 306 providing access to an electrical outlet 308. The base 304 is configured to receive the outlet 308 and a set of electrical components 310, and is configured to connect to an outlet housing or junction box. Although the charger 300 is a two-gang assembly, it is configured to connect to a standard one-gang outlet housing. The outlet 308 includes a pair of three-prong outlets 312 and a pair of USB outlets 314. Different outlet configurations can also be used, including two prong outlets or only USB outlets. Additionally, other electrical devices can be provided in the first side of the faceplate 302. For example, switches (e.g., paddle switch, rocker switch, dimmer switch, touch switch, smart switch, etc.) can be used with the faceplate 302 and the inductive charger.

A second side of the faceplate 302 includes an inductive charging portion 316, and a charger assembly 318 is positioned between the faceplate 302 and the base 304 to provide inductive charging to an electronic device. One or more conductors 320 extend from the outlet portion to the charger assembly 318 to provide power to the inductive charger. A device support 322 extends from the faceplate 302 to receive an electronic device for charging. The device support 322 can include a pad 324 to provide increased friction and/or a cushioned surface for the electronic device.

Figure 18:
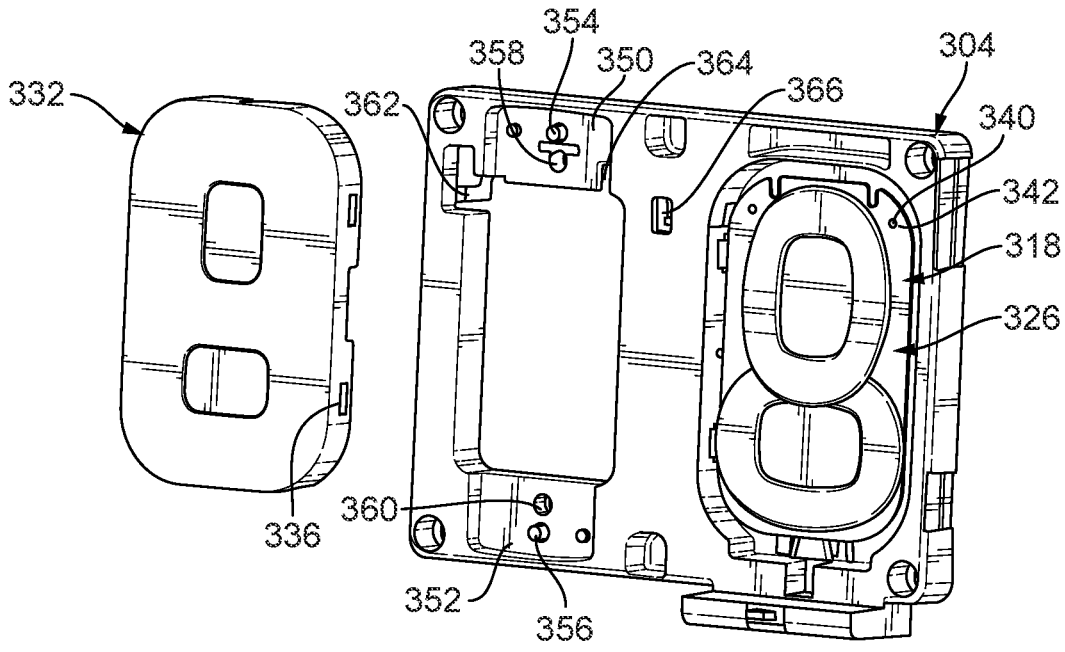
FIG. 18 is a partially exploded, front perspective view of the base and the charger assembly.
Figure 19:
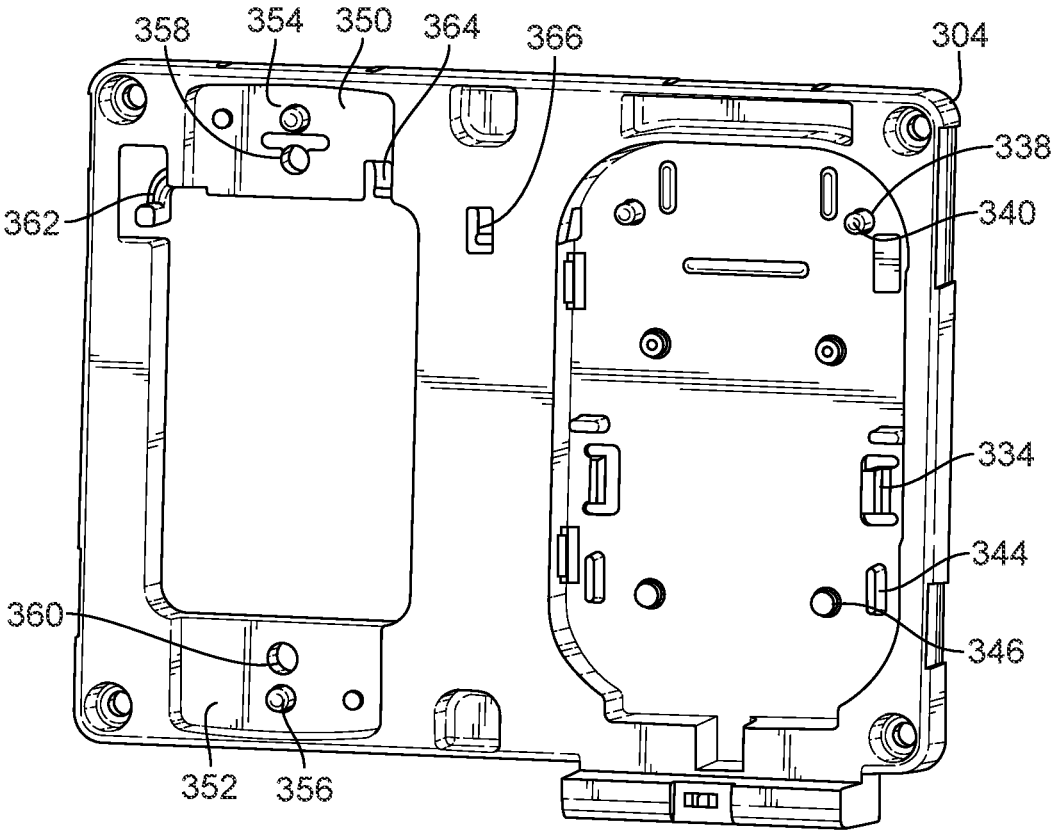
FIG. 19 is a front perspective view of the base of FIG. 15.
Figure 20:
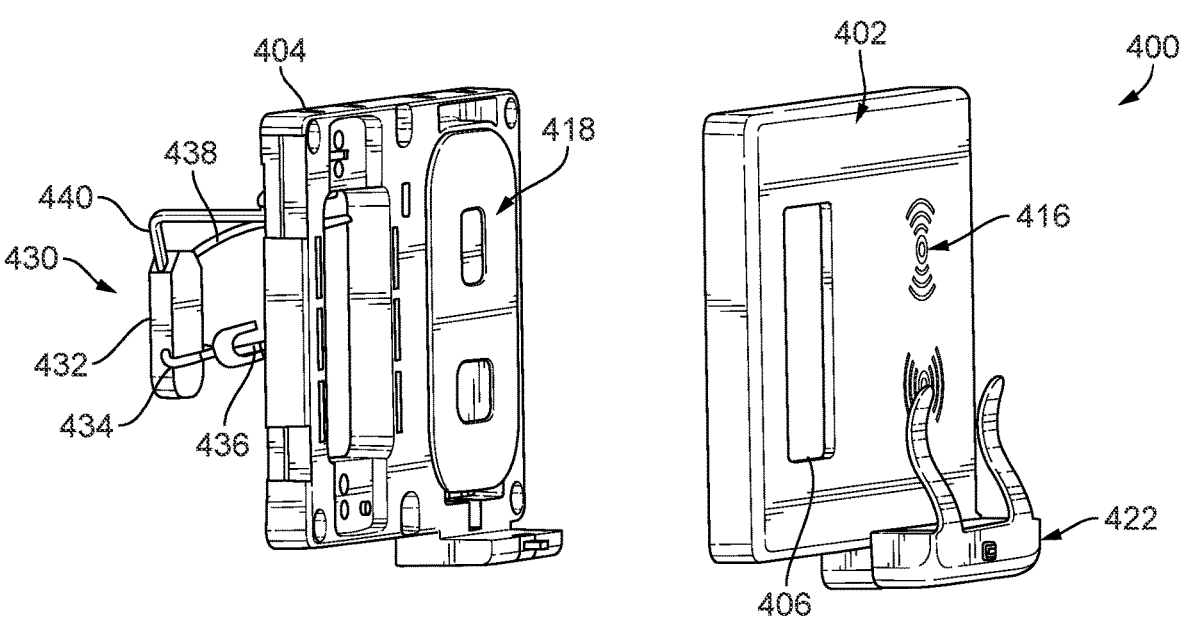
FIG. 20 is a partially exploded, front perspective view of an exemplary two-gang charger with a pigtail adaptor.
Figure 21:
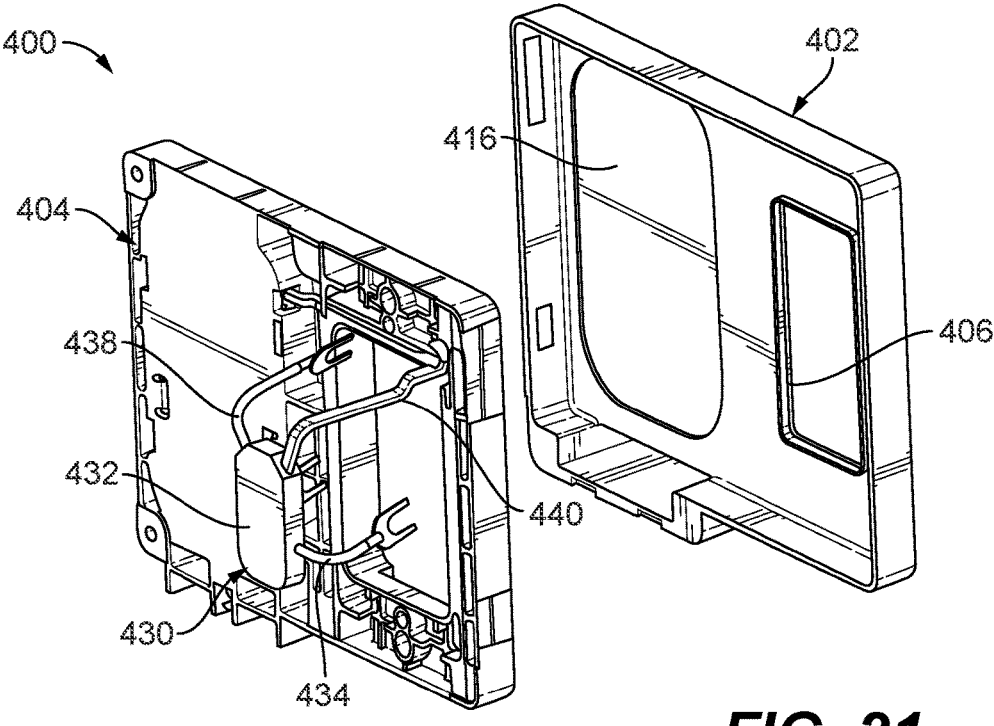
FIG. 21 is a rear perspective view of FIG. 20.

The features of the two-gang charger 300 are substantially the same as those described above for the one-gang charger 300. As shown in FIGS. 18 and 19, the charger assembly 318 does not include a rear cover and instead the charging pad 326, circuit boards, and front cover 332 are received directly by the base 304. The base 304 includes a set of snap-fit projections, for example deflectable hooks 334 that are configured to connect to the slots 336 in the front cover 332. A pair of bosses 338 extend from the base 304 and the upper circuit board is provided with openings corresponding to the bosses 338. The bosses 338 include an upper knub 340. The knubs 340 are used to engage openings 342 on the charging pad 326. Side projections 344 are used to center the charging pad 326 and the lower circuit board and various internal projections 346 are used to space the charger assembly 318 components above the rear wall of the base 304.

As best shown in FIG. 19, the outlet portion of the base 304 includes an upper depression 350 and a lower depression 352 for receiving a standard outlet mounting strap. An upper boss 354 and a lower boss 356 engage openings in the mounting strap and upper apertures 358 and lower apertures 360 receive fasteners to secure the outlet to the base 304. The outlet portion includes one or more cable management components to position the conductor extending between the outlet portion and the charging portion. The cable management components can include an arm 362 and a first hook 364 positioned in the outlet portion and a second hook 366 positioned between the outlet portion and the charging portion.

FIGS. 20-23 show an exemplary embodiment of a two-gang charger 400 configuration with a device portion and an inductive charger portion. The two-gang charger 400 includes a faceplate 402 that is connected to a base 404. A first side of the faceplate 402 includes a device opening 406 providing access to an electrical device, for example an outlet 408. The base 404 is configured to receive the electrical device and is configured to connect to an outlet housing or junction box. Although the charger 400 is a two-gang assembly, it is configured to connect to a standard one-gang outlet housing. The outlet 408 includes a pair of two-prong outlets and a pair of USB outlets. Different outlet configurations can also be used, including two prong outlets or only USB outlets. Additionally, other electrical devices can be provided in the first side of the faceplate 402. For example, switches (e.g., paddle switch, rocker switch, dimmer switch, touch switch, smart switch, etc.) can be used with the faceplate 402 and the inductive charger.

A second side of the faceplate 402 includes an inductive charging portion 416, and a charger assembly 418 is positioned between the faceplate 402 and the base 404 to provide inductive charging to an electronic device. A device support 422 extends from the faceplate 402 to receive an electronic device for charging, as discussed in further detail above.

A pigtail adaptor 430 is provided to supply power from the electrical device side to the inductive charger assembly 418. The pigtail adaptor 430 includes an adaptor housing 432. Control circuitry can be positioned in the adaptor housing 432. For example, the adaptor housing 432 can include circuitry that converts AC power supplied to the electrical device (e.g., outlet 408) to a low voltage AC or DC output.

Figure 22:
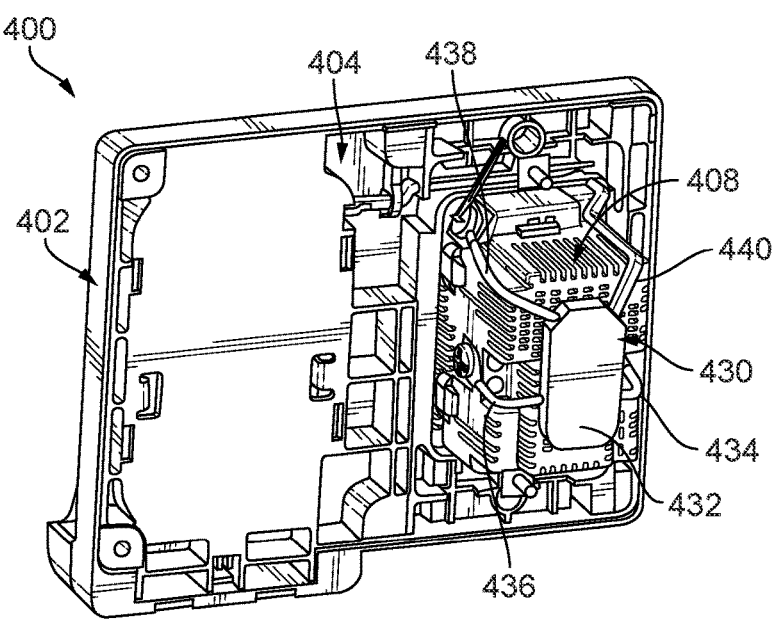
FIG. 22 is a rear perspective view of the charger of FIG. 20 assembled with an outlet.

One or more input conductors extend from the adaptor housing 432. The illustrated embodiment shows a hot conductor 434 and a neutral conductor 436. A ground conductor 438 can also be provided. Each of the conductors 434, 436, 438 can include a connector, for example a forked terminal connector. The conductors 434, 436, 438 can be connected to the respective terminals of an associated electrical device installed in the base 404. For example, the conductors 434, 436, 438 can be connected to the appropriate terminals on an outlet 408 as shown in FIG. 22.

An output conductor 440 extends from the adaptor housing 432 to the charger assembly 418. In some embodiments, the output conductor 440 is routed through the base 404. The base 404 can include one or mor channels that receive the output conductor 44o. The output conductor 440 extends through an opening in the base 404 to be electrically connected to the charger assembly 418.

Figure 23:
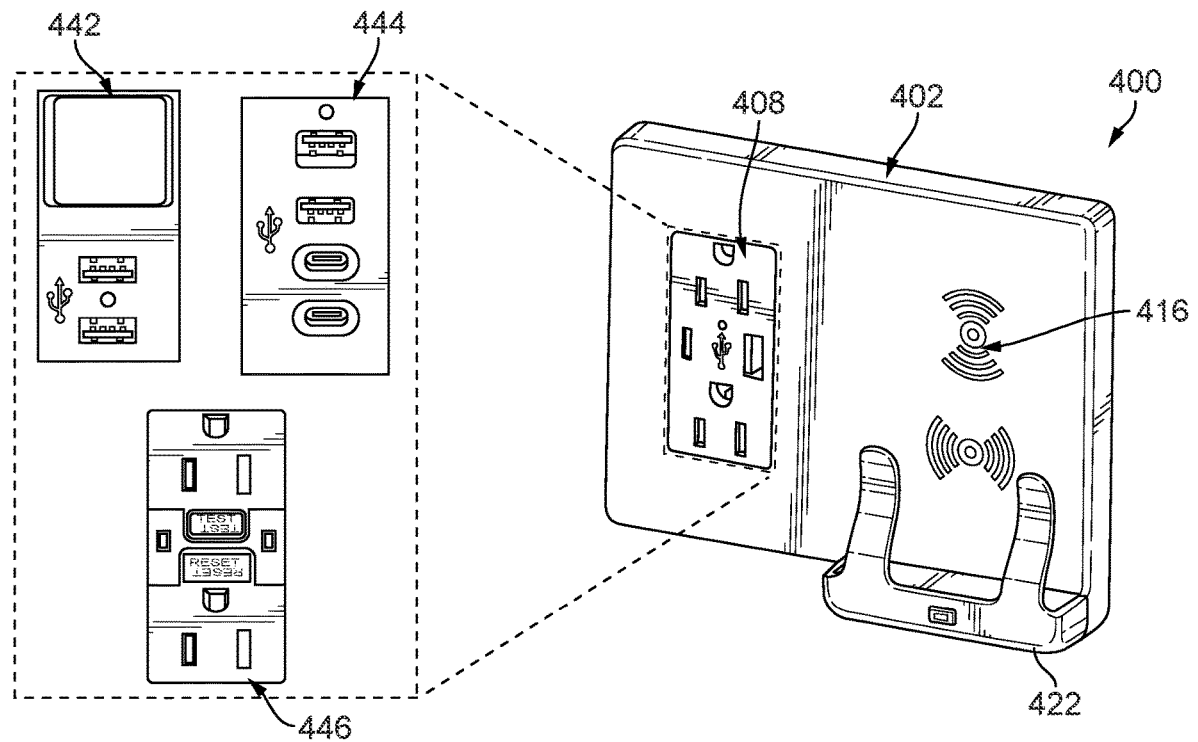
FIG. 23 is a front perspective view of FIG. 22 with an inset showing some examples of different electrical devices that can be incorporated with the charger.

FIG. 23 shows an inset of different electrical devices that can be assembled with the two-gang charger 40o. For example, a switch USB device 442, a four USB device 444, or a GFCI outlet 446 can be connected to the base 404.

Figure 24:
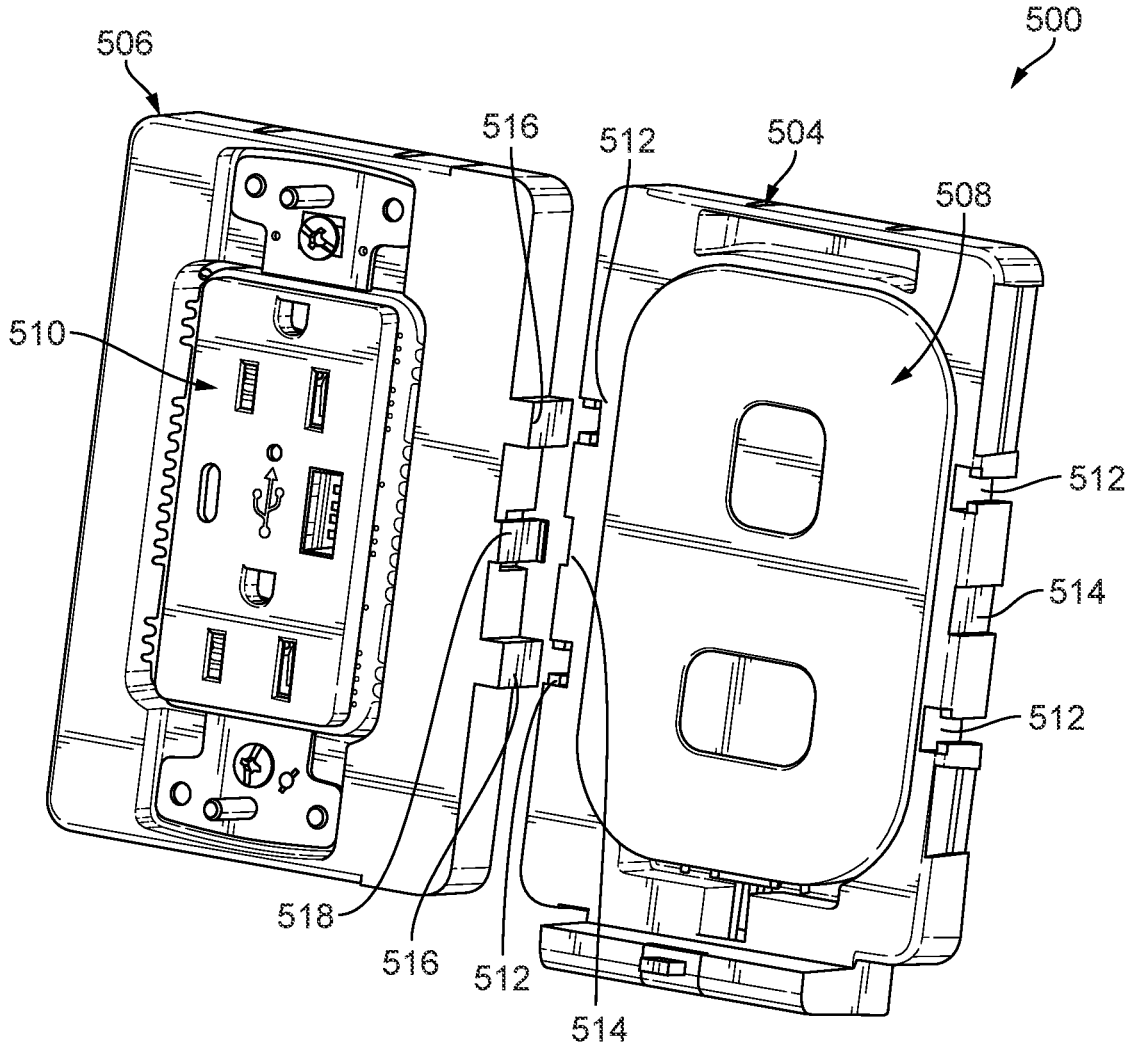
FIG. 24 is a front perspective view of an exemplary separable, multi-gang charger.

FIG. 24 shows an exemplary embodiment of a multi-gang charger 500 configuration with a device portion and an inductive charger portion. The multi-gang charger incorporates an inductive charger base 504 and a device base 506. The charger base 504 receives an inductive charger assembly 508 and the device base 506 receives an electrical device, such as an outlet 510 as shown in the illustrated embodiment. Other embodiments can incorporate different outlets or switches.

The charger base 504 and the device base 506 are releasably connected to one another. For example, the charger base 504 includes a first connecting feature and the device base 506 includes a second connecting feature that is configured to mate with the first connecting features. These connecting features can include various mechanical connectors such as snap-fit features, interlocking features, interference fit features, or other connectors. In some embodiments, the charger base 504 includes two of the first connecting features, with one first connecting feature positioned on each side of the charger base 504.

As best shown in FIGS. 25-27, in the illustrated embodiment, the first connecting features includes a set of slots extending into the charger base 504. The slots can include pair of outer slots 512 and a central slot 514. The outer slots 512 can have a substantially T-shaped configuration. The second connecting features include a set of protrusions extending from the device base 506. The protrusions are configured to mate with the slots. The protrusions can include outer protrusions 516 and a central protrusion 518. The outer protrusions 516 can have a substantially T-shaped configuration to mate with the outer slots 512. The T-shaped protrusions 516 can have a blind end as best shown in FIG. 26 to form a stop when the bases 504, 506 are mated together. The central protrusion 518 can include a snap-fit connector, for example, a cantilevered arm having a hook. The arm resiliently engages the central slot with the hook engaging an outer major surface of the charger base 504.

Using the connecting features, the device base 506 can be connected to either side of the charger base 504. A faceplate 502 having either a left-hand or right-hand configuration can then be connected to the combined bases 504, 506 to present a uniform exterior appearance. FIG. 28 shows a faceplate 502A having a right-hand configuration and a faceplate 502B having a left-hand configuration. In some embodiments, using the connecting features, additional devices and bases can be connected with the bases 504, 506 to form three, four, or more gang assemblies. In some embodiments, each base 504, 506 can include one male and one female connecting feature so that the bases can be daisy-chained together to an exact number and configuration as required.

Figure 30:
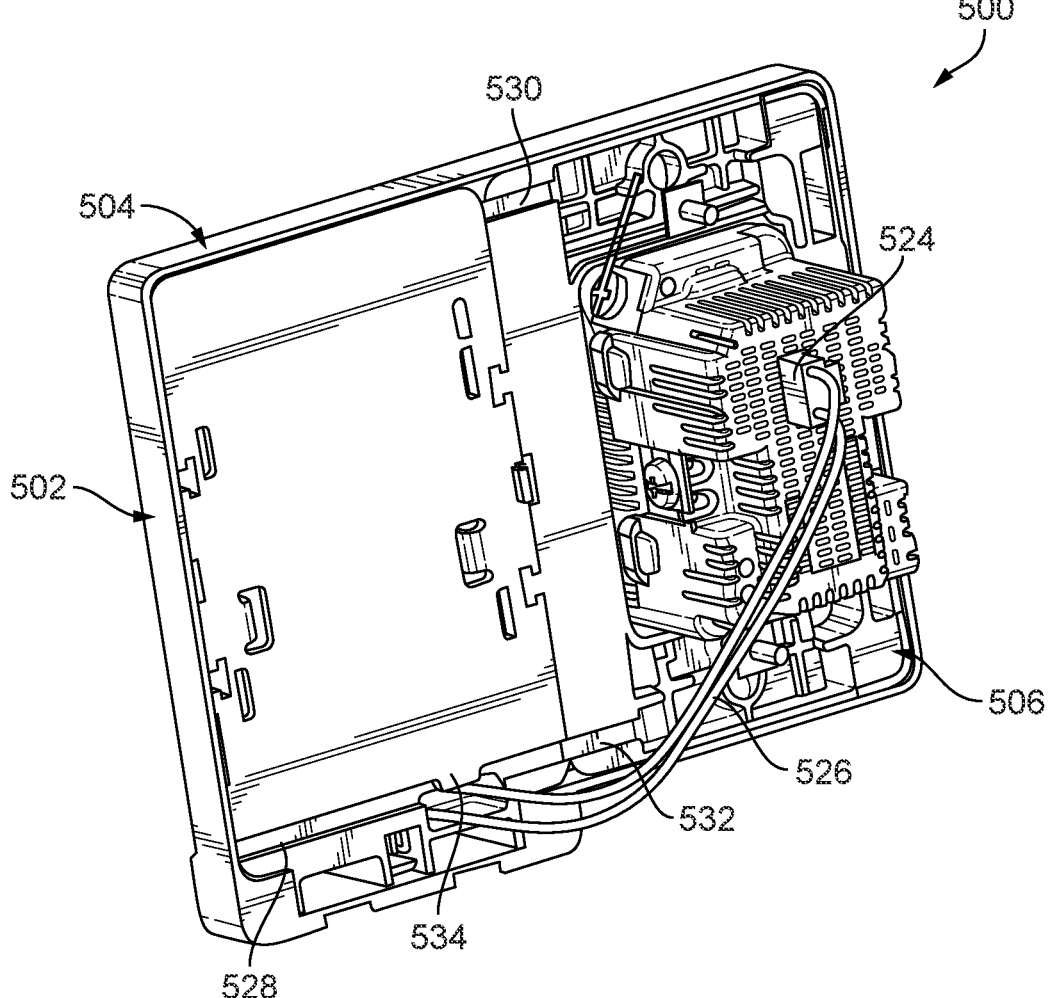
FIG. 30 is a rear perspective view of the multi-gang charger assembled with the outlet of FIG. 29.

FIGS. 29-30 depict an exemplary embodiment of a power output configuration for the inductive charging assembly. Although depicted and described in conjunction with the multi-gang charger assembly 500, it can be utilized with any of the inductive charger assemblies described herein.

As shown in FIG. 29, a first connector 520 can be provided in the rear of the electrical device, for example the outlet 510. The first connector 520 is depicted as a male dual pin connector, although other types of common connectors can be used. The connector 520 is positioned inside of a housing 522 of the outlet 510. The first connector 520 can be connected to a circuit that converts the AC power supplied to the outlet to a DC output that is passed through connector 520 to the charger assembly 508.

As shown in FIG. 30, a second connector 524 is plugged into the first connector 520. In an exemplary embodiment the second connector 524 is a female plug connector. One or more conductors 526 extend from the second connector 524 to the charger assembly 508. The charger base 504 includes a conductor channel 528 positioned along the bottom of the base 504 to receive the conductors 526. The device base 506 can include a first conductor channel 530 and a second conductor channel 532 positioned on opposite ends of the device base 506. Depending on which side of the charger base 504 the device base 506 is positioned on, one of the device conductor channels 530, 532 will align with the charger conductor channel 528 to provide cable management for the conductors 526. A tab 534 can extend over the charger conductor channel 528 near an opening for the conductors 526 to extend into the charger base 504.

The conductors 526 can supply DC power to a charger assembly and a set of electrical components positioned in the charger base 504 to provide inductive charging to an electronic device. The electrical components can include control circuitry that is configured to power and control one or more inductive coils. The control circuitry can include components to provide power conversion, frequency modulation, and other features associated with inductive charging. These features can be established by one or more industry standards, for example, the Qi wireless charging standard.

Figure 31:
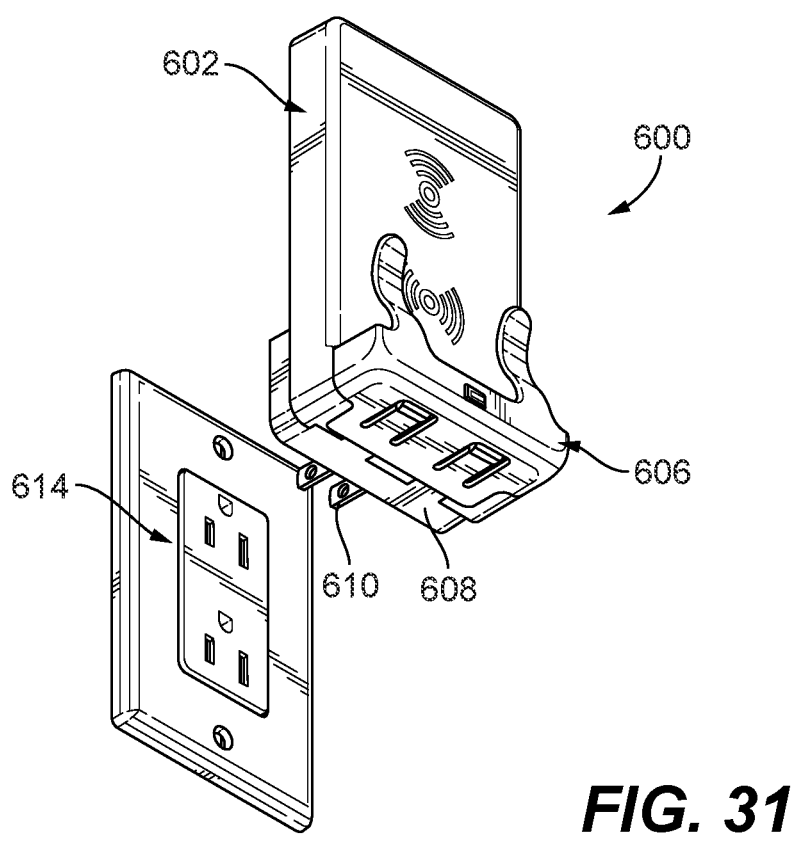
FIG. 31 is a front perspective view of a single-gang portable inductive charger.
Figure 32:
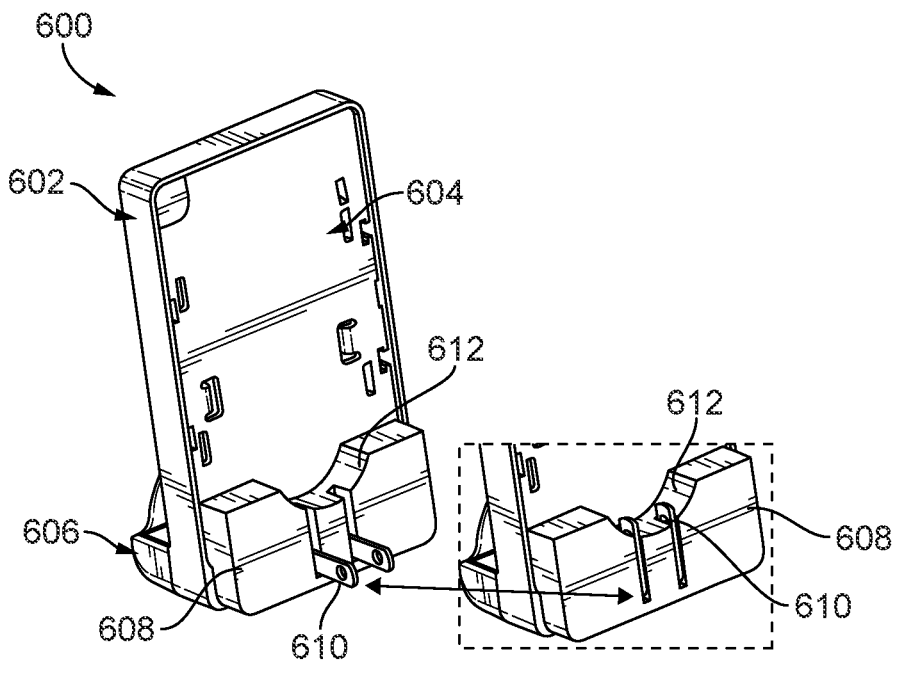
FIG. 32 is a rear perspective view of the single-gang portable inductive charger.
Figure 35:
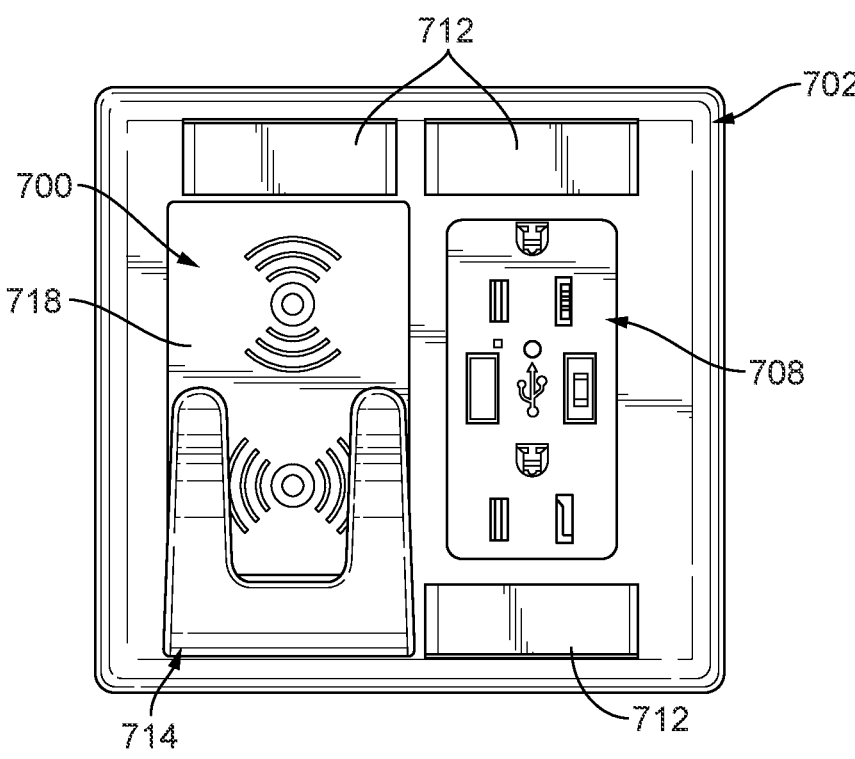
FIG. 35 is a front view of the inductive charger of FIG. 33 assembled with the wall plate.
Figure 36:
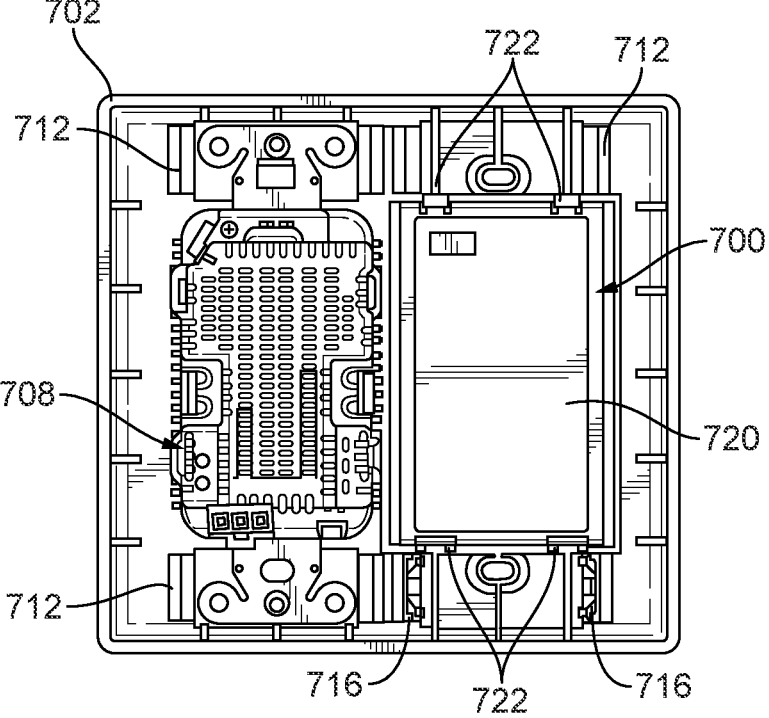
FIG. 36 is a rear view of FIG. 35.

FIGS. 31 and 32 show another exemplary embodiment of a portable inductive charger 600 that is configured to releasably connect to an outlet. The charger 600 includes a faceplate 602 that is connected to a base 604. A device support 606 extends from the faceplate 602 to receive an electronic device for charging. The rear of the base 604 includes a plug 608 having foldable blades 610. The plug 608 extends from the rear of the base 604. The blades 610 are rotatably connected to the plug body 608 and moveable between a first position where they are extended from the plug 608 and a second position where they are substantially recessed in the plug 608. The plug 608 can include a channel 612 (e.g., a curved depression) providing access to the ends of the blades 610 in the second position.

The plug 608 is configured as a non-polarized plug that can fit into any standard outlets 614. Although two prongs are shown (standardized in the US) other types of plugs can be used depending on the location. Additionally, a USB connector or other power connector can be used instead of a standard bladed plug.

FIGS. 33-37 show another exemplary embodiment of an inductive charging unit 700 configured to be used with an electrical device wall plate 702. The wall plate 702 is depicted with a two-gang configuration having a first opening 704 and a second opening 706. The first and second openings 704, 706 have a rectangular configuration and can receive one or more types of electrical devices, such as the inductive charger 700, an outlet 708, or a switch (not shown).

One or more slots 710 are positioned adjacent the openings. The illustrated embodiment shows two slots 710 positioned above and below each opening 704, 706. The slots 710 are configured to receive components associated with the wall plate 702 and the framed electrical devices. For example, a cover member 712 can be connected to the wall plate 702. The cover member 712 can have different colors to act as an indicator or provide an association to a user about the electrical device positioned in the respective opening 704, 706. The cover member 712 can also be transparent and be placed over a label positioned between the cover member 712 and the wall plate. 702

A device support 714 can also be configured to releasably connect to the sets of lower slots 710. For example, the device support 714 can include cantilever arms 716 that are configured to extend through the slots 710 and form a snap-fit engagement with the wall plate 702.

The charging unit 700 includes a housing having a faceplate 718 and a base 720 surrounding an interior. The interior of the housing can contain one or more inductive charging coils and control circuitry associated with providing wireless charging to a device positioned adjacent the charger housing. The charging unit 700 can be connected to a main power supply or be powered through the adjacent electrical device. For example, a DC power output can extend from the outlet 708 to the charging unit 700. The control circuitry can include components to provide power conversion, frequency modulation, and other features associated with inductive charging. These features can be established by one or more industry standards, for example, the Qi wireless charging standard.

The charger housing can be configured to releasably connect to the wall plate 702. For example, a snap-fit connection can be used to connect the charger housing and the wall plate 702. In the illustrated embodiment, the top and the bottom of the face plate 718 and each include a pair of cantilever arms 722 having a hook member positioned at the free end. The charger housing can be press-fit into one of the openings 704, 706, so that the arms deflect and the hook members engage the wall plate 702 adjacent the edge of the respective opening.

Figure 37:
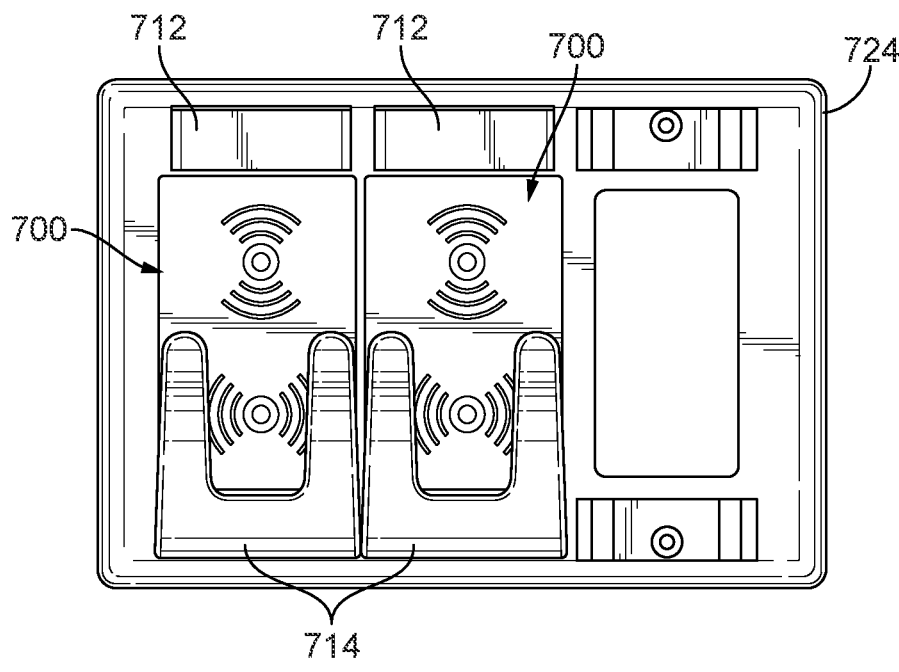
FIG. 37 is a front view of a three-gang inductive charging unit for use with a wall plate.

The wall plate 702 can be configured to have the charger housing connect to either the left or right side. FIG. 37 shows an example of a three-gang wall plate assembly 724 that utilizes two inductive charging units 700. Another electrical device, such as an outlet 708 or switch can be provided in the third opening. The charging units 700 can be daisy-chained together to receive power from the adjacent electrical device or from a main power supply.

Figure 38:
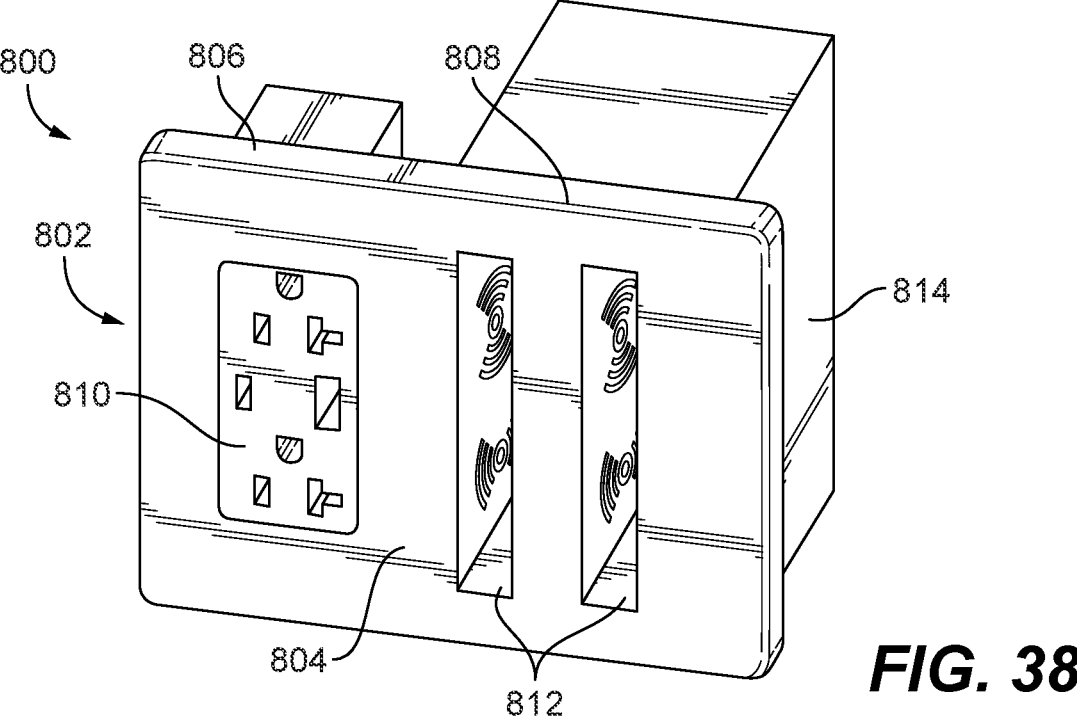
FIG. 38 is a front perspective view of an inductive charging unit having recessed charging slots.

FIG. 38 shows another exemplary embodiment of an inductive charging unit 800. The charging unit 800 includes a housing 802 having a faceplate 804 with a receptacle portion 806 and an inductive charging portion 808. The faceplate 804 is configured to be mounted substantially flush with a wall or other support surface. The housing 802 is shown as a two-gang housing, although a single-gang configuration, or greater than two-gang configurations can also be used.

The receptacle portion 806 receives an electrical device, for example an outlet 810 or a switch. In the illustrated embodiment the receptacle portion 806 is positioned on the left side of the housing 802, although a right-side configuration may also be used.

The inductive charging portion 808 includes one or more slots 812. The slots 812 extend through the faceplate 804 and into a charging support body 814. The charging support body 814 can be formed separately or integrally with the faceplate 804. The slots 812 are configured to receive a portable electronic device (e.g., a mobile phone). The illustrated embodiment shows two slots 812, however fewer or more slots may also be used.

One or more charging assemblies are configured to charge an electronic device when it is positioned in one of the slots 812. The charging assemblies can include inductive coils positioned in the walls adjacent the slots or in the rear of the support body 814. The inductive coils can be powered by an associated charging circuit. One or more indicators can be associated with each of the slots to provide charging status information to a user. The indicators can include lights (e.g., LEDs) or a screen (e.g., LCD screen) to convey charging information.

Figure 39:
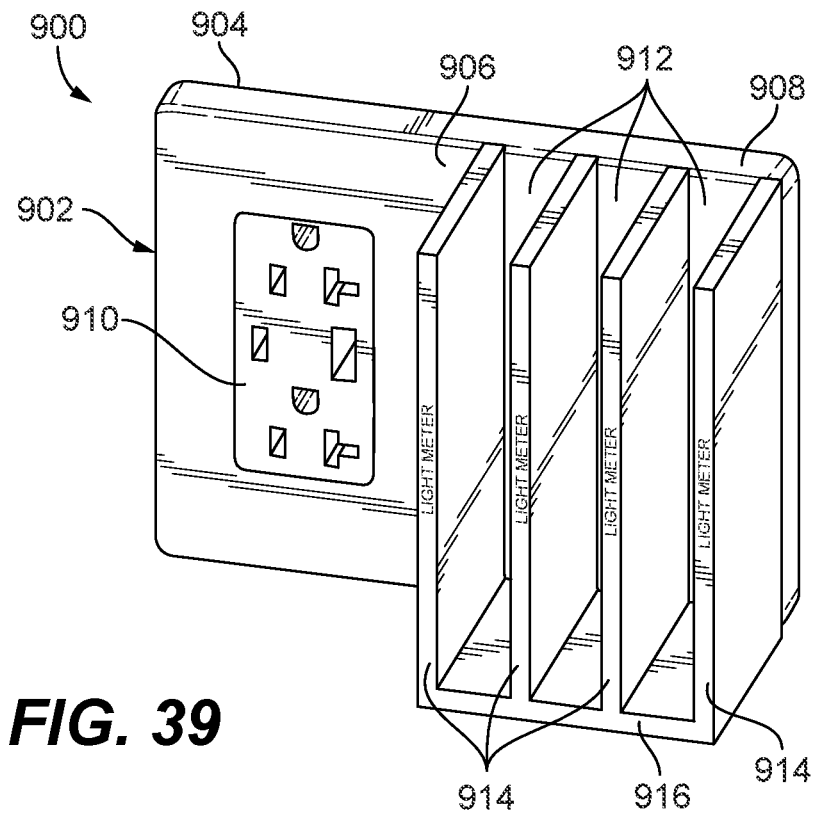
FIG. 39 is a front perspective view of an inductive charging unit having outwardly extending, vertical charging slots.

FIG. 39 shows another exemplary embodiment of an inductive charging unit 900. The charging unit 900 includes a housing 902 having a faceplate 904 with a receptacle portion 906 and an inductive charging portion 908. The faceplate 904 is configured to be mounted substantially flush with a wall or other support surface. The housing 902 is shown as a two-gang housing, although a single-gang configuration, or greater than two-gang configurations can also be used.

The receptacle portion 906 receives an electrical device, for example an outlet 910 or a switch. In the illustrated embodiment the receptacle portion 906 is positioned on the left side of the housing 902, although a right-side configuration may also be used.

The inductive charging portion 908 includes one or more slots 912. The slots 912 extend outwardly from the faceplate 904 and are defined by a series of side walls 914 and a bas 916. The side walls 914 and base 916 can be formed separately or integrally with the faceplate 904. The slots 912 are configured to receive a portable electronic device (e.g., a mobile phone). The illustrated embodiment shows three slots 912, however fewer or more slots may also be used.

One or more charging assemblies are configured to charge an electronic device when it is positioned in one of the slots 912. The charging assemblies can include inductive coils positioned in the side walls 914, the base 916, or the faceplate 904. The charging assembly can also be positioned behind the faceplate 904. The inductive coils can be powered by an associated charging circuit. One or more indicators can be associated with each of the slots to provide charging status information to a user. The indicators can include lights (e.g., LEDs) or a screen (e.g., LCD screen) to convey charging information. The indicator can be positioned on an outer edge of the side walls 914 or the base 916.

Figure 40:
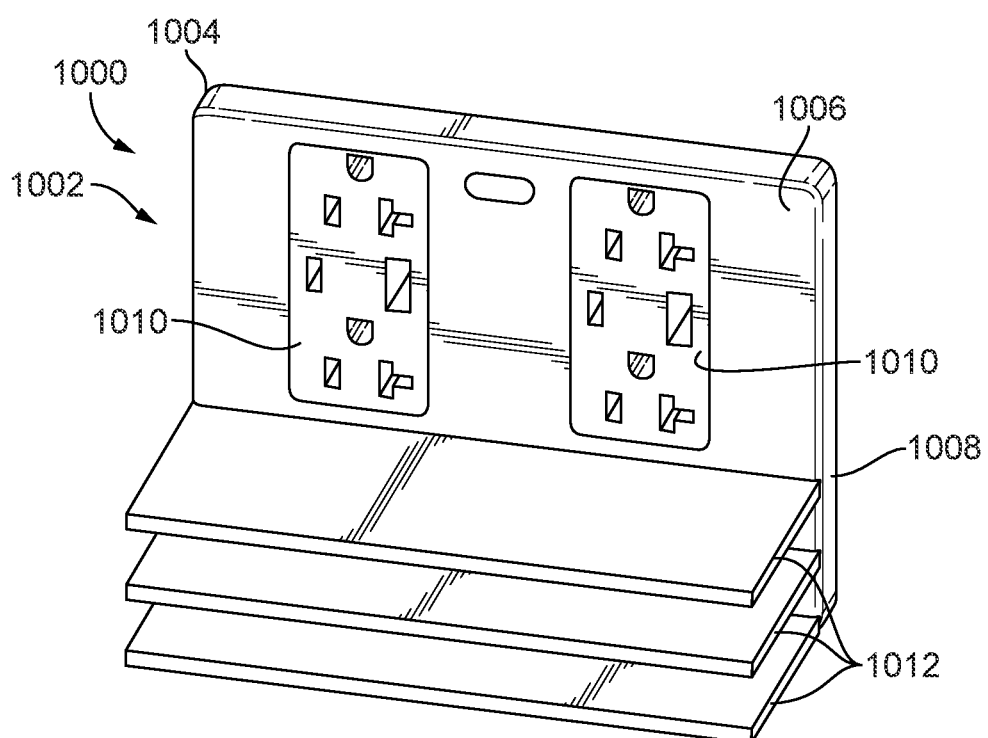
FIG. 40 is a front perspective view of an inductive charging unit having outwardly extending, horizontal charging supports.

FIG. 40 shows another exemplary embodiment of an inductive charging unit moo. The charging unit 1000 includes a housing 1002 having a faceplate 1004 with an upper receptacle portion 1006 and a lower inductive charging portion 1008. The faceplate 1004 is configured to be mounted substantially flush with a wall or other support surface. The housing 1002 is shown as a two-gang housing, although a single-gang configuration, or greater than two-gang configurations can also be used.

The receptacle portion 1006 receives an electrical device, for example a pair of outlets 1010 or a switch. In the illustrated embodiment the receptacle portion 1006 is positioned on the top of the housing 1002, although other configurations may also be used.

The inductive charging portion 1008 includes one or more supports 1012. The supports 1012 extend outwardly from the faceplate 1004 in a cantilever fashion. Receiving areas are defined above the upper supports 1012 and between the lower supports 1012. The supports 1012 can be formed separately or integrally with the faceplate 1004. The supports 1012 are configured to receive a portable electronic device (e.g., a mobile phone). The illustrated embodiment shows three supports 1012, however fewer or more supports 1012 may also be used.

One or more charging assemblies are configured to charge an electronic device when it is positioned on one of the supports 1012. The charging assemblies can include inductive coils positioned in the supports or the faceplate 1004. The charging assembly can also be positioned behind the faceplate 1004. The inductive coils can be powered by an associated charging circuit. One or more indicators can be associated with each of the supports 1012 to provide charging status information to a user. The indicators can include lights (e.g., LEDs) or a screen (e.g., LCD screen) to convey charging information. The indicator can be positioned on an outer edge of the support 1012.

Figure 41:
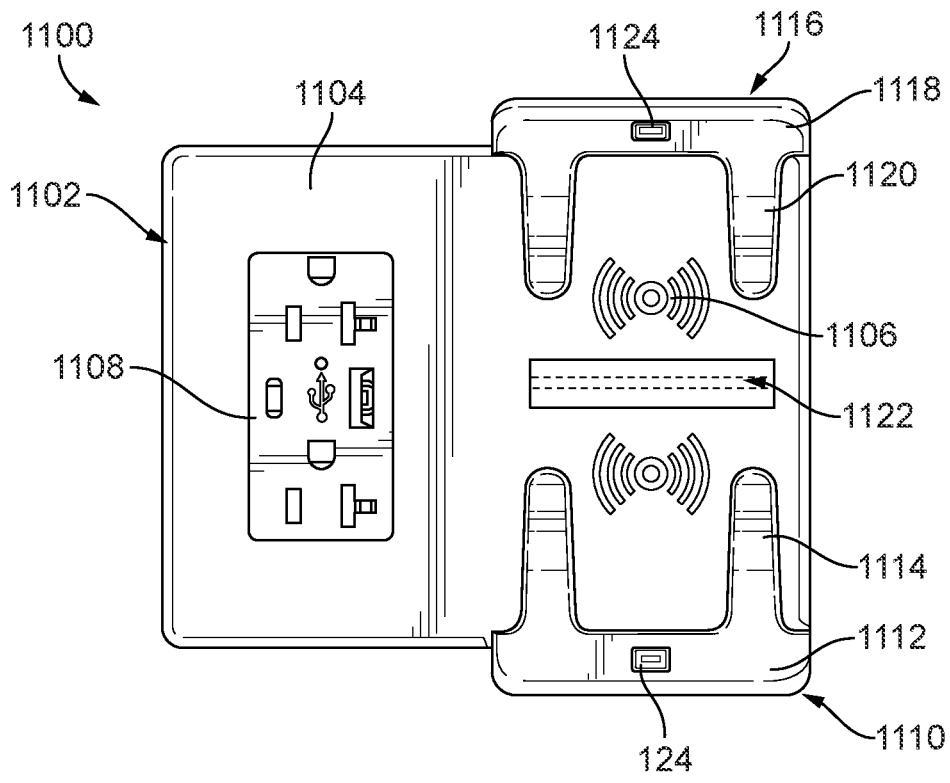
FIG. 41 is a front view of a two-gang inductive charging assembly having multiple charging ports.

FIG. 41 shows an exemplary embodiment of a two-gang charger 1100 configuration with a faceplate 1102 having a receptacle portion 1104 and an inductive charger portion 1106. The receptacle portion 1104 includes a receptacle opening providing access to an electrical outlet 1108. The outlet 1108 includes a pair of three-prong outlets and a pair of USB outlets. Different outlet configurations can also be used, including two prong outlets or only USB outlets. Additionally, other electrical devices can be provided in the receptacle portion 1104 of the faceplate 1102. For example, switches (e.g., paddle switch, rocker switch, dimmer switch, touch switch, smart switch, etc.) can be used with the faceplate 1102 and the inductive charger.

In the inductive charging portion 1106, a lower device support 1110 extends from the faceplate 1102. The lower device support 1110 includes a ledge 1112 and one or more flexible prongs 1114 extending from the ledge 1112. Although shown as split prongs 1114, a single prong or more than two prongs can be used. The prongs 1114 curve toward the faceplate 1102 and can be resilient to accommodate devices of different thicknesses.

An upper device support 1116 extends from the faceplate 1102 opposite the lower device support 1110. The upper device support 1116 includes a ledge 1118 and one or more flexible prongs 1120 extending from the ledge 1118. Although shown as split prongs 1120, a single prong or more than two prongs can be used. The prongs 1120 curve toward the faceplate 1102 and can be resilient to accommodate devices of different thicknesses.

A central device support 1122 is positioned between the upper and lower device supports 1110, 1116. The central device support 1122 can be a rigid member having a T-shaped configuration with a base extending from the faceplate 1102 and an outer flange extending perpendicular to the base. A first device can be positioned for charging between the lower device support 1110 and the central device support 1122 and a second device can be positioned for charging between the upper device support 1116 and the central device support 1122.

One or more charging assemblies are configured to charge an electronic device when it is positioned on one of the supports 1110, 1116. The charging assemblies can include inductive coils positioned in the supports 1110, 1116 or behind the faceplate 1102. The inductive coils can be powered by an associated charging circuit. One or more indicators 1124 can be associated with each of the supports 1110, 1116 to provide charging status information to a user. The indicators can include lights (e.g., LEDs) or a screen (e.g., LCD screen) to convey charging information. The indicator can be positioned on an outer edge of the support 1110, 1116.

Figure 42:
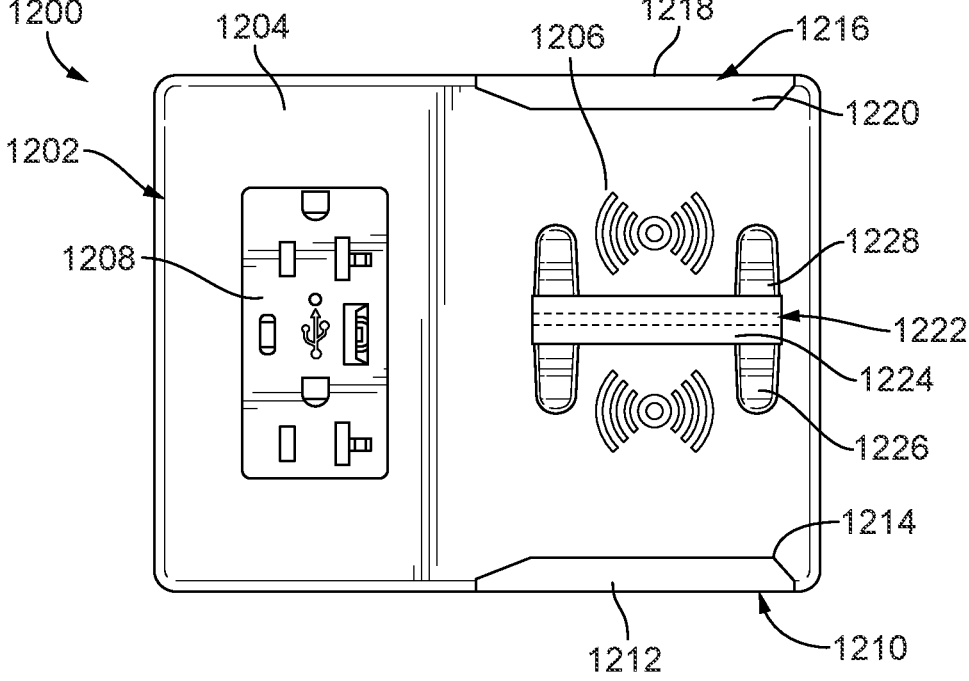
FIG. 42 is a front view of a two-gang inductive charging assembly having multiple charging ports.

FIG. 42 shows an exemplary embodiment of a two-gang charger 1200 configuration with a faceplate 1202 having a receptacle portion 1204 and an inductive charger portion 1206. The receptacle portion 1204 includes a receptacle opening providing access to an electrical outlet 1208. The outlet 1208 includes a pair of three-prong outlets and a pair of USB outlets. Different outlet configurations can also be used, including two prong outlets or only USB outlets. Additionally, other electrical devices can be provided in the receptacle portion 1204 of the faceplate 1202. For example, switches (e.g., paddle switch, rocker switch, dimmer switch, touch switch, smart switch, etc.) can be used with the faceplate 1202 and the inductive charger.

In the inductive charging portion 1206, a lower device support 1210 extends from the faceplate 1202. The lower device support 1210 includes a ledge 1212 and one or more tabs 1214 extending from the ledge 1212. Although shown as a single tab 1214, multiple tabs can be used. The ledge 1212 and tab 1214 can be rigid.

An upper device support 1216 extends from the faceplate 1202. The upper device support 1216 includes a ledge 1218 and one or more tabs 1220 extending from the ledge 1218. Although shown as a single tab 1220, multiple tabs can be used. The ledge 1218 and tab 1220 can be rigid.

A central device support 1222 is positioned between the upper and lower device supports 1210, 1216. The central device support 1222 includes a ledge 1224, one or more flexible lower prongs 1226 extending from the ledge 1224 toward the lower device support 1210, and one or more flexible upper prongs 1228 extending from the ledge 1224 toward the upper device support 1216. Although shown as split prongs 1226, 1228, a single prong or more than two prongs can be used. The prongs 1226, 1228 can curve toward the faceplate 1202 and can be resilient to accommodate devices of different thicknesses.

A first device can be positioned for charging between the lower device support 1210 and the central device support 1222 and a second device can be positioned for charging between the upper device support 1216 and the central device support 1222. One or more charging assemblies are configured to charge an electronic device when it is positioned on one of the supports 1210, 1216. The charging assemblies can include inductive coils positioned behind the faceplate 1202 or in the supports. The inductive coils can be powered by an associated charging circuit. One or more indicators (not shown) can be associated with each of the supports 1210, 1216, 1222 to provide charging status information to a user. The indicators can include lights (e.g., LEDs) or a screen (e.g., LCD screen) to convey charging information.

Various other exemplary embodiments can incorporate inductive charging with other electrical devices, for example, switches, pop-up outlets, counter-top outlets, etc. Inductive chargers or combination devices can also incorporate smart home systems, such as Amazon Alexa or Google home.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A wall outlet inductive charger comprising:
   a base having a receptacle portion and an inductive charging portion;
   a faceplate connected to the base; and
   a charger assembly connected to the base and positioned between the base and the faceplate, the charger assembly including an inductive coil;
   wherein the inductive charging portion includes a plurality of slots extending through the faceplate and into the charger assembly, the plurality of slots configured to separately receive electrical devices to be charged; and wherein the inductive charging portion includes a plurality of indicators associated with each of the slots, the plurality of indicators configured to provide charging status information to a user.

2. The wall outlet inductive charger of claim 1, further comprising an adaptor to supply power from an electrical device positioned in the receptacle portion to the charger assembly.

3. The wall outlet inductive charger of claim 2, wherein the adaptor connects to a terminal of the electrical device and includes a control circuit positioned in an adaptor housing.

4. The wall outlet inductive charger of claim 1, wherein the base includes an inductive charger base releasably connected to a receptacle base.

5. The wall outlet inductive charger of claim 4, wherein the receptacle base includes a first connecting feature positioned on a first side and a second connecting feature positioned on a second side, and wherein the inductive charger base includes a third connecting feature connectable to both the first connecting feature and the second connecting feature.

6. The wall outlet inductive charger of claim 4, wherein the inductive charger base includes a set of protrusions configured to mate with the slots.

7. The wall outlet inductive charger of claim 6, wherein the base includes a channel receiving the conductor.

8. The wall outlet inductive charger of claim 6, wherein the first connector includes a male connector and the conductor is connected to the male connector by a female connector.

9. The wall outlet inductive charger of claim 1, wherein an electrical device is positioned in the receptacle portion, the electrical device having an first side including a user-facing outlet and a second side including a first connector, and wherein a conductor connected to the first connector provides power from the electrical device to the charger assembly.

10. The wall outlet inductive charger of claim 1, wherein the device support defines a first slot for receiving a personal electronic device and a second slot for receiving a personal electronic device.

11. The wall outlet inductive charger of claim 10, wherein the slots extend through the faceplate into a charging support body.

12. The wall outlet inductive charger of claim 10, wherein the slots extend outwardly from the faceplate and are defined by a series of side walls and a base.

13. The wall outlet inductive charger of claim 1, wherein the device support includes a lower device support having a first ledge and one or more flexible prongs, an upper device support having a second ledge and one or more flexible prongs, and a central support positioned between the upper and lower device supports.

14. The wall outlet inductive charger of claim 1, wherein the device support includes a lower device support having a first ledge and one or more tabs, an upper device support having a second ledge and one or more tabs, and a central support positioned between the upper and lower device supports and having a ledge, a first flexible prong extending from the ledge toward the lower device support, and a second flexible prong extending from the ledge toward the upper device support.

15. The wall outlet inductive charger of claim 1, wherein the receptacle portion is configured to receive an outlet or a switch.

16. A wall outlet inductive charger comprising:

a base having a receptacle portion and an inductive charging portion;

a faceplate connected to the base;

a device support extending from the faceplate; and a charger assembly connected to the base and positioned between the base and the faceplate, the charger assembly including an inductive coil, wherein the base is configured to connect to a one-gang wall opening and the charger assembly receives power from the device positioned in the receptacle opening;

wherein the inductive charging portion includes a plurality of slots extending through the faceplate and into the charger assembly, the plurality of slots configured to separately receive electrical devices to be charged; and wherein the inductive charging portion includes a plurality of indicators associated with each of the slots, the plurality of indicators configured to provide charging status information to a user.

17. A wall outlet inductive charger comprising:

a wall plate having a first opening, a second opening, a set of upper slots and a set of lower slots extending through the wall plate, wherein the set of upper slots and the set of lower slots are configured to separately receive electrical devices to be charged;

an inductive charger unit positioned in the first opening, the inductive charger unit having a base, a faceplate, and an inductive charger positioned between the base and a faceplate;

a plurality of indicators associated with each of the upper slots and the lower slots, the plurality of indicators configured to provide charging status information to a user;

a device support connected to one of the lower slots beneath the inductive charger unit; and an outlet positioned in the second opening.

18. The wall outlet inductive charger of claim 17, wherein the inductive charger unit is connected to the first opening using a snap-fit connector.

19. The wall outlet inductive charger of claim 17, wherein a cover can be releasably connected to at least one selected from a group consisting of the set of upper slots and the set of lower slots.

20. The wall outlet inductive charger of claim 19, wherein a label is positioned between the cover and the faceplate.

* * * * *